(12) United States Patent
Shimada et al.

(10) Patent No.: US 11,321,129 B2
(45) Date of Patent: May 3, 2022

(54) RESOURCE ALLOCATION CONTROL BASED ON PERFORMANCE-RESOURCE RELATIONSHIP

(71) Applicant: Hitachi, Ltd., Tokyo (JP)

(72) Inventors: Akio Shimada, Tokyo (JP); Mitsuo Hayasaka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/176,428

(22) Filed: Feb. 16, 2021

(65) Prior Publication Data
US 2022/0075657 A1 Mar. 10, 2022

(30) Foreign Application Priority Data
Sep. 9, 2020 (JP) .............................. JP2020-151371

(51) Int. Cl.
*G06F 9/50* (2006.01)
*G06F 11/30* (2006.01)
*G06F 11/34* (2006.01)

(52) U.S. Cl.
CPC .......... *G06F 9/5011* (2013.01); *G06F 9/5061* (2013.01); *G06F 11/3006* (2013.01); *G06F 11/3075* (2013.01); *G06F 11/3409* (2013.01); *G06F 11/3428* (2013.01); *G06F 11/3447* (2013.01); *G06F 9/5044* (2013.01); *G06F 11/3485* (2013.01); *G06F 2209/501* (2013.01); *G06F 2209/508* (2013.01)

(58) Field of Classification Search
None
See application file for complete search history.

(56) References Cited

U.S. PATENT DOCUMENTS

| | | | | |
|---|---|---|---|---|
| 8,555,287 | B2* | 10/2013 | Ding | G06F 3/0484 718/104 |
| 10,255,217 | B2 | 4/2019 | Pendharkar et al. | |
| 2006/0218285 | A1* | 9/2006 | Talwar | G06F 9/5072 709/227 |
| 2009/0183168 | A1* | 7/2009 | Uchida | G06F 11/3442 718/104 |

(Continued)

OTHER PUBLICATIONS

Kundu et al., Application Performance Modeling in a Virtualized Environment, 2009, IEEE (Year: 2009).*

(Continued)

*Primary Examiner* — Abu Zar Ghaffari
(74) *Attorney, Agent, or Firm* — Mattingly & Malur, PC

(57) ABSTRACT

In a management node that controls the amount of hardware resources of storage nodes to be allocated to the software of distributed data stores executed by storage nodes, the management node includes a disk device that stores a performance model indicating the correspondence relationship between the amount of hardware resources and the performance that can be implemented by the hardware of the resource amount, and a central processing unit (CPU) connected to the disk device, in which the CPU receives the target performance by distributed data stores, determines the hardware resource amount required to achieve the target performance based on the performance model, and sets to allocate hardware of the determined resource amount to the programs of the distributed data stores.

8 Claims, 25 Drawing Sheets

(56) References Cited

U.S. PATENT DOCUMENTS

| | | | | |
|---|---|---|---|---|
| 2013/0185433 | A1* | 7/2013 | Zhu | H04L 43/0882 |
| | | | | 709/226 |
| 2014/0380307 | A1* | 12/2014 | Zhu | G06F 9/45533 |
| | | | | 718/1 |
| 2015/0378848 | A1* | 12/2015 | Kaneko | G06F 11/142 |
| | | | | 714/19 |
| 2016/0321114 | A1* | 11/2016 | Cardosa | G06F 9/45558 |
| 2018/0267833 | A1* | 9/2018 | Chen | G06F 11/3006 |
| 2019/0188041 | A1* | 6/2019 | Yi | G06F 9/5044 |
| 2019/0196421 | A1* | 6/2019 | Littlefield | G16H 20/60 |
| 2019/0286488 | A1* | 9/2019 | Yu | G06F 9/50 |
| 2019/0370146 | A1* | 12/2019 | Babu | G06N 20/00 |
| 2020/0159174 | A1* | 5/2020 | Lu | G06F 9/5055 |
| 2020/0192714 | A1* | 6/2020 | Clow | G06F 9/5027 |
| 2021/0096928 | A1* | 4/2021 | Reed | G06F 11/1448 |
| 2021/0279187 | A1* | 9/2021 | Puder | G06F 9/5055 |

OTHER PUBLICATIONS

Jiang et al., Resource Allocation in Contending Virtualized Environments through VM Performance Modeling and Feedback , 2011, IEEE, 2011 Sixth Annual ChinaGrid Conference, pp. 196-203 (Year: 2011).*

Rossem et al, Profile-Based Resource Allocation for Virtualized Network Functions, 2019, IEEE Transactions on Network and Service Management, vol. 16, No. 4, (Year: 2019).*

* cited by examiner

FIG. 11

| DISTRIBUTED DATA STORE A ||||||| |
|---|---|---|---|---|---|---|---|
| OPERATION || Sequential Read [MB/s] | Sequential Write [MB/s] | Random Read [IOPS] | Random Write [IOPS] | Metadata Ops. [OPS] | RESOURCE ALLOCATION AMOUNT SETTING |
| TARGET PERFORMANCE || 100 | 80 | 20000 | 10000 | 5000 | |
| REQUIRED HW RESOURCE AMOUNT | CPU [Core] | 0.5 | 0.5 | 1.0 | 1.5 | 2.0 | 2.0 |
| | MEMORY [MB] | 500 | 500 | 200 | 200 | 100 | 500 |
| | NIC BAND [MB/s] | 150 | 150 | 10 | 10 | 20 | 150 |
| | Block IO BAND [MB/s] | 100 | 100 | 20 | 50 | 10 | 100 |

*FIG. 16*

| DISTRIBUTED DATA STORE A | | | | | | | |
|---|---|---|---|---|---|---|---|
| OPERATION | | Sequential Read [MB/s] | Sequential Write [MB/s] | Random Read [IOPS] | Random Write [IOPS] | Metadata Ops. [OPS] | RESOURCE ALLOCATION AMOUNT SETTING |
| TARGET PERFORMANCE | | 100 | 80 | 20000 | 10000 | 5000 | 1500 |
| REQUIRED HW RESOURCE AMOUNT | CPU [Core] | 0.5 | 0.5 | 1.0 | 1.5 | 2.0 | 2.0 => 0.5 |
| | MEMORY [MB] | 500 | 500 | 200 | 200 | 100 | 500 |
| | NIC BAND [MB/s] | 150 | 150 | 10 | 10 | 20 | 150 |
| | Block IO BAND [MB/s] | 100 | 100 | 20 | 50 | 10 | 100 |

RESOURCE ALLOCATION CONTROL BASED ON PERFORMANCE-RESOURCE RELATIONSHIP

CROSS-REFERENCE TO RELATED APPLICATION

The present application claims priority from Japanese application JP 2020-151371, filed on Sep. 9, 2020, the contents of which is hereby incorporated by reference into this application.

BACKGROUND OF THE INVENTION

1. Field of the Invention

The present invention relates to a technology for controlling the allocation of hardware resources (HW resources) for software execution.

2. Description of Related Art

A data lake is widely used as a storage for storing data for artificial intelligence (AI), data analysis and the like. The data lake is a multi-protocol data store and the data lake includes distributed data stores such as file storages, object storages, NoSQL, and the like. In a data lake, since a plurality of distributed data stores coexist, there is a problem that HW resource conflicts, which are scrambles for HW resources between data stores, occur between the distributed data stores in each node constituting the data lake and the performance of the distributed data stores becomes unstable. Therefore, quality of service (QoS) control for solving such a problem is required.

As a technique related to QoS control, for example, a technique for controlling the amount of HW resources allocated to software on a server, such as Cgroups of Linux (registered trademark) and the technique described in U.S. Pat. No. 10,255,217, is known. Using such a technique, the data lake administrator can set the amount of HW resources to be allocated to each distributed data store executed on the data lake. As a result, even when a conflict occurs, each distributed data store can occupy and use a set amount of HW resources and a constant level of performance can be maintained.

SUMMARY OF THE INVENTION

With the above technology, since the administrator manually calculates the amount of HW resources to be allocated to the distributed data store, it is difficult to set the allocation amount of HW resources to each distributed data store in just proportion according to the target performance.

For example, if the allocation amount of HW resources to the distributed data store is insufficient, the distributed data store may not be able to achieve the target performance. On the other hand, if the amount of HW resources is excessively allocated to the distributed data store, sufficient HW resources cannot be allocated to the other distributed data stores and the target performance may not be able to be achieved in the other distributed data stores. Therefore, accurate QoS control for each distributed data store is difficult.

During the operation of the data lake, the relationship between the allocation amount of HW resources and the performance may change due to the effects of changes in the number of nodes that constitute the data lake, program updates of the distributed data store, bugs, and the like. Even if the administrator can accurately set the allocation amount of HW resources to the distributed data store at the beginning, if the relationship between the allocation amount of HW resources and the performance changes, the achievement of the target performance may be difficult.

In a distributed data store, the amount of HW resources required differs depending on the type of operation (IO operation) to be executed. Therefore, the central processing unit (CPU) allocation amount is increased for an operation that consumes a large amount of CPU, but if the operation is not actually executed, CPU resources are wasted.

The present invention has been made in view of the above circumstances and an object thereof is to provide a technique capable of appropriately allocating HW resources to the software.

In order to achieve the above object, the resource allocation control device according to one aspect is a resource allocation control device that controls the amount of hardware resources of a predetermined node to be allocated to software executed on the predetermined node and includes a storage unit that stores performance resource amount information indicating the correspondence relationship between the amount of hardware resources and the performance that can be implemented by the software by the hardware of the resource amount, and a processor connected to the storage unit, in which the processor receives a target performance by the software, determines the amount of hardware resources required to implement the target performance based on the performance resource amount information, and sets to allocate hardware of the determined resource amount to the software.

According to the present invention, HW resources can be appropriately allocated to software.

BRIEF DESCRIPTION OF THE DRAWINGS

FIG. 11 is a configuration diagram of a resource allocation setting table according to the first embodiment;

FIG. 16 is a diagram illustrating an outline of updating the resource allocation setting table according to the first embodiment;

DESCRIPTION OF EMBODIMENTS

The embodiments will be described with reference to the drawings. It should be noted that the embodiments described below do not limit the invention according to the claims, and all of the elements and combinations thereof described in the embodiments are not essential for the means for solving the invention.

In the following description, the process may be described with the "program" as the operating subject, but since the program is executed by a processor (for example, a CPU) to perform the specific process while appropriately using a storage resource (for example, a memory) and/or a communication interface device (for example, a network interface card (NIC)), the subject of the process may be a program. The process described with a program as the operation subject may be a process performed by a processor or a computer equipped with the processor.

In the following descriptions, the information may be described by an expression of "AAA table", but the information may be expressed by any data structure. That is, the "AAA table" can be referred to as "AAA information" to show that the information does not depend on the data structure.

Figure 1:
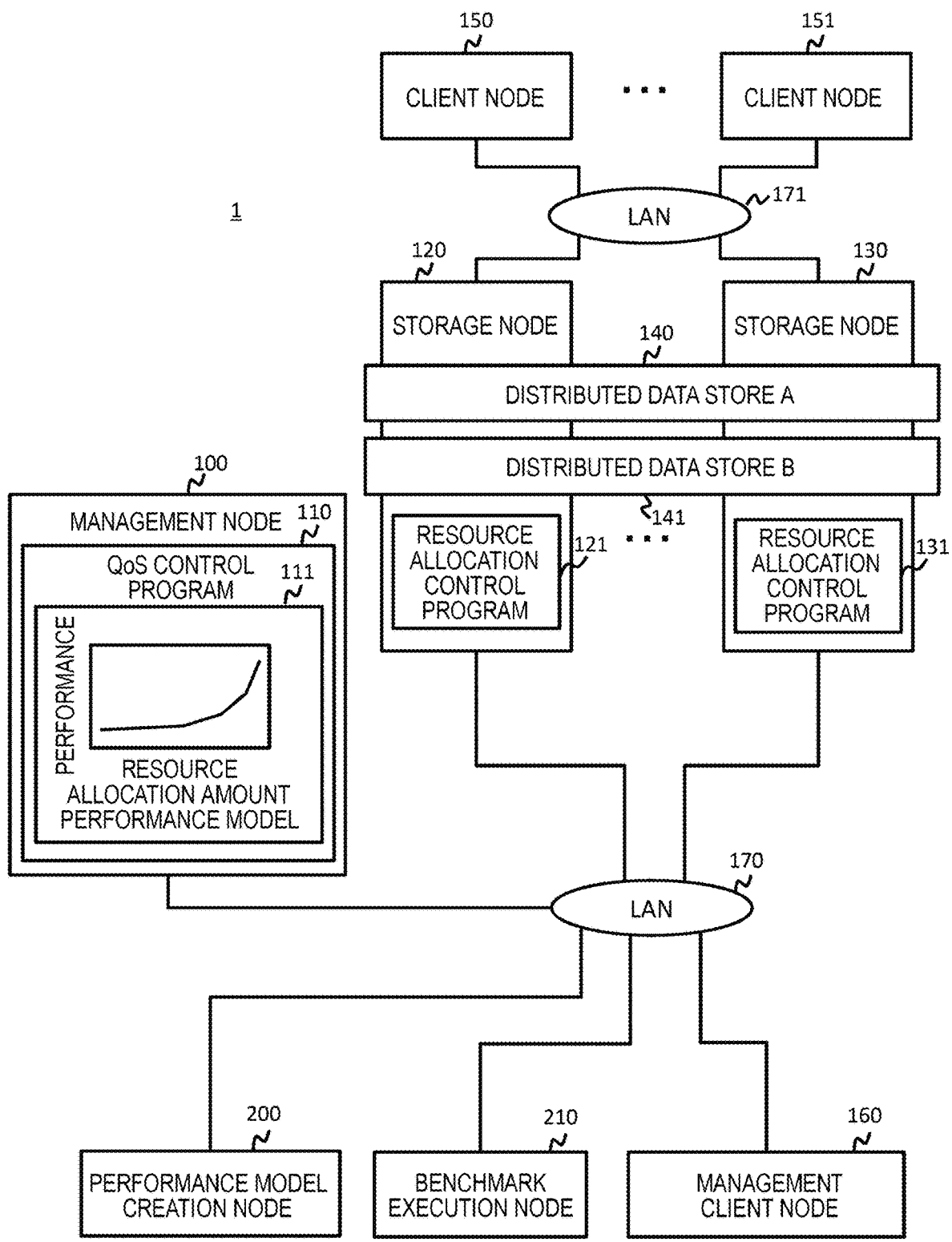
FIG. 1 is an overall configuration diagram of a computer system according to a first embodiment.

FIG. 1 is an overall configuration diagram of a computer system according to a first embodiment.

A computer system 1 includes a management node 100 as an example of a resource allocation control device, client nodes 150 and 151, storage nodes 120 and 130, a management client node 160, a performance model creation node 200, and a benchmark execution node 210.

The client nodes 150 and 151 and the storage nodes 120 and 130 are connected to each other via a network such as a local area network (LAN) 171. The storage nodes 120 and 130, the management node 100, the management client node 160, the performance model creation node 200, and the benchmark execution node 210 are connected to each other via a network such as a LAN 170.

The client nodes 150 and 151 execute predetermined processing and issue IO requests (read requests, write requests, and the like) to the distributed data store configured on the storage nodes 120 and 130 along with the processing. Although the number of client nodes is two in the drawings, the number may be one or three or more.

The storage nodes 120 and 130 are examples of execution nodes and constitute one or more distributed data stores (a distributed data store 140 (distributed data store A), and a distributed data store 141 (distributed data store B)) in cooperation with each other. In the drawings, there are two storage nodes but there may be three or more. In the drawings, the number of distributed data stores configured with a plurality of storage nodes is two, but one or three or more distributed data stores may be configured.

The distributed data stores 140 and 141 configured of the storage nodes 120 and 130 receive the IO request from the client nodes 150 and 160 and execute IO processing corresponding to the IO request. The storage nodes 120 and 130 store the resource allocation control programs 121 and 131, respectively. The resource allocation control programs 121 and 131 control the amount of HW resources allocated to the program (software) of each distributed data store based on the setting of the allocation amount of HW resources (HW resource allocation amount) from the management node 100.

The management client node 160 receives a target performance of each of the distributed data stores 140 and 141 configured on the storage node from the administrator and transmits the target performance to the management node 100.

The management node 100 stores a QoS control program 110. The QoS control program 110 stores a performance model 111. The performance model 111 is an example of performance resource amount information indicating the relationship between the resource allocation amount and the program performance. Although only one performance model is shown in the drawing, there may be as many as the number of distributed data stores configured on the storage node.

The QoS control program 110 calculates HW resource allocation amounts for the distributed data stores 140 and 141 configured on the storage nodes 120 and 130 based on the performance model 111 and the target performance received from the management client node 160. The QoS control program 110 transmits the calculated HW resource allocation amounts to the resource allocation control program 121 of the storage node 120 and the resource allocation control program 131 of the storage node 130.

The performance model creation node 200 is an example of the creation node, and the performance model 111 is created and stored in the management node 100. The benchmark execution node 210 measures the performance of a program (for example, a program constituting a distributed data store) in the storage nodes 120 and 130. At least one of the performance model creation node 200 and the benchmark execution node 210 may be incorporated in the management node 100.

Next, QoS control in a data lake configured by the storage nodes 120 and 130 will be described.

Figure 2:
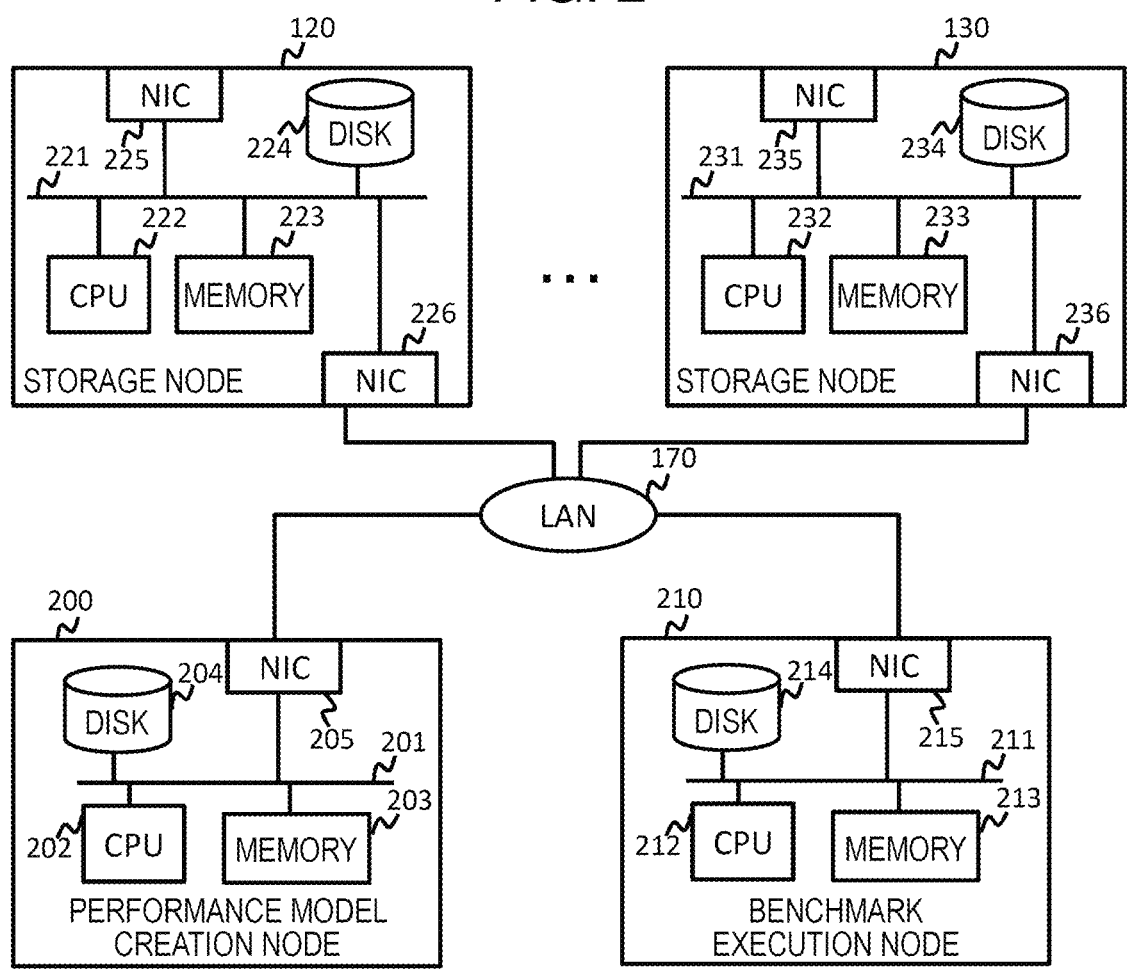
FIG. 2 is a hardware configuration diagram of components related to a performance model creation process according to the first embodiment.

FIG. 2 is a hardware configuration diagram of components related to a performance model creation process according to the first embodiment.

In the present embodiment, among the components of the computer system 1, the performance model creation node 200, the benchmark execution node 210, the storage node 120, and the storage node 130 are mainly involved in the performance model creation process.

In the present embodiment, the performance model creation process uses the storage nodes 120 and 130 that constitute the distributed data store that is finally provided to the client nodes but the present invention is not limited thereto. A plurality of similar storage nodes other than the storage nodes 120 and 130 may be used.

The storage node 120 includes a CPU 222 as an example of a processor, a memory 223 as a main storage device, a disk device 224 as a secondary storage device, and NICs 225 and 226. The CPU 222, the memory 223, the disk device 224, and the NICs 225 and 226 are connected via a bus 221.

The CPU 222 executes various processes by reading the program stored on the disk device 224 into the memory 223 and executing the program. The CPU 222 transmits and receives data to and from other devices (the storage node 130, the performance model creation node 200, the benchmark execution node 210, and the like) connected to the LAN 170 via the bus 221 and the NIC 226.

The storage node 130 includes a CPU 232 as an example of a processor, a memory 233 as a main storage device, a disk device 234 as a secondary storage device, and NICs 235 and 236. The CPU 232, the memory 233, the disk device 234, and the NICs 235 and 236 are connected via a bus 231.

The CPU 232 executes various processes by reading the program stored on the disk device 234 into the memory 233 and executing the program. The CPU 232 transmits and receives data to and from other devices (the storage node 120, the performance model creation node 200, the benchmark execution node 210, and the like) connected to the LAN 170 via the bus 231 and the NIC 236.

The performance model creation node 200 includes a CPU 202 as an example of a processor, a memory 203 as a main storage device, a disk device 204 as a secondary storage device, and a NIC 205. The CPU 202, the memory 203, the disk device 204, and the NIC 205 are connected via a bus 201.

The CPU 202 executes various processes by reading the program stored on the disk device 204 into the memory 203 and executing the program. The CPU 202 transmits and receives data to and from other devices (the storage nodes 120 and 130, the benchmark execution node 210, and the like) connected to the LAN 170 via the bus 201 and the NIC 205.

The benchmark execution node 210 includes a CPU 212 as an example of a processor, a memory 213 as a main storage device, a disk device 214 as a secondary storage device, and a NIC 215. The CPU 212, the memory 213, the disk device 214, and the NIC 215 are connected via a bus 211.

The CPU 212 executes various processes by reading the program stored on the disk device 214 into the memory 213 and executing the program. The CPU 212 transmits and receives data to and from other devices (the storage nodes 120 and 130, the performance model creation node 200, and the like) connected to the LAN 170 via the bus 211 and the NIC 215.

Figure 3:
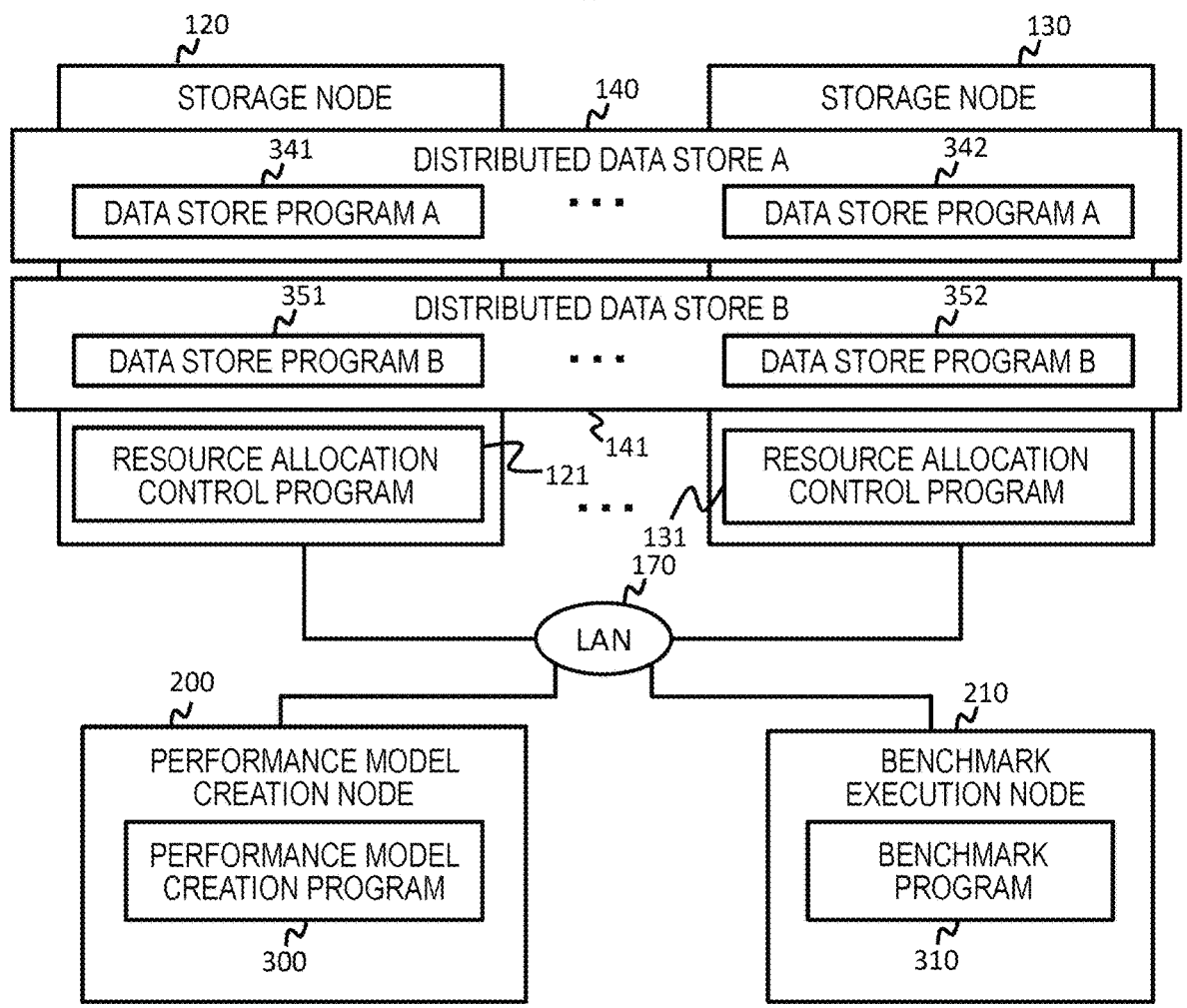
FIG. 3 is a logical configuration diagram of components related to the performance model creation process according to the first embodiment.

FIG. 3 is a logical configuration diagram of the components related to the performance model creation process according to the first embodiment.

The storage node 120 stores a data store program 341 (data store program A), a data store program 351 (data store program B), and a resource allocation control program 121.

The storage node 130 stores a data store program 342 (data store program A), a data store program 352 (data store program B), and a resource allocation control program 131.

The data store program 341 executed by the CPU 222 of the storage node 120 and the data store program 342 executed by the CPU 232 of the storage node 130 operate in cooperation with each other to constitute the distributed data store 140 (distributed data store A).

The data store program 351 executed by the CPU 222 of the storage node 120 and the data store program 352 executed by the CPU 232 of the storage node 130 operate in cooperation with each other to constitute the distributed data store 141 (distributed data store B).

When executed by the CPU 222, the resource allocation control program 121 controls the amount of HW resources (HW resource allocation amount) allocated to each data store program executed by the storage node 120.

When executed by the CPU 232, the resource allocation control program 131 controls the HW resource allocation amount allocated to each data store program executed by the storage node 130.

The performance model creation node 200 stores the performance model creation program 300. When executed by the CPU 202, the performance model creation program 300 creates performance models of the distributed data stores 140 and 141 configured on the storage nodes 120 and 130.

The benchmark execution node 210 stores the benchmark program 310. When executed by the CPU 212, the benchmark program 310 measures the performances of the distributed data stores 140 and 141 configured on the storage nodes 120 and 130.

Next, the performance model creation process 400 for creating the performance model will be described.

Figure 4:
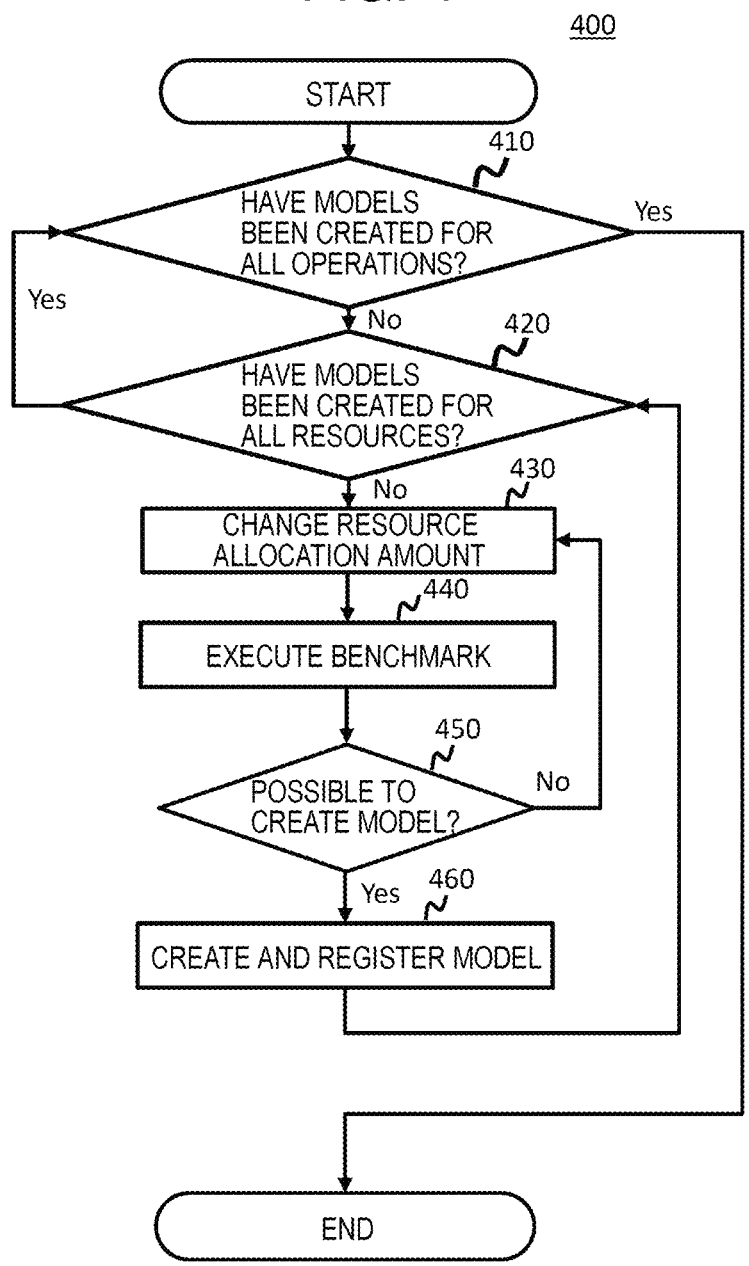
FIG. 4 is a flowchart of the performance model creation process according to the first embodiment.

FIG. 4 is a flowchart of the performance model creation process according to the first embodiment.

In the performance model creation process of the present embodiment, a performance model is created for each type of operation of the distributed data store. Here, the operation refers to an IO operation on a data store, for example, if the data store is a file data store, the operation refers to sequential Read and Write, random Read and Write, and metadata operations (for example, file creation and deletion, directory creation and deletion, and the like), and if the data store is a NoSQL data store, the operation refers to data insertion, deletion, search, and the like in the database (DB). In the present embodiment, a performance model for each type of operation is created for each HW resource. Here, the HW resource is a CPU, a memory, a NIC band, an IO band of a disk device, or the like. According to the performance model creation process, a performance model indicating the relationship between the allocation amount of each HW resource and the performance of the distributed data store (strictly speaking, the data store program) at each allocation amount is created for each type of operation.

First, the performance model creation program 300 (strictly speaking, the CPU 202 that executes the performance model creation program 300) of the performance model creation node 200 checks whether performance models have been created for all operation types of the distributed data store (step 410). As a result, if the performance models have been created for all the operation types (step 410: Yes), the performance model creation program 300 ends the performance model creation process 400.

On the other hand, if the performance models for all the operation types have not been created (step 410: No), the performance model creation program 300 creates performance models for the uncreated operation types. Here, the operation type to be a target is referred to as a target operation type.

First, the performance model creation program 300 checks whether the performance models of all the HW resources for which the performance model is to be created have been created for the target operation type (step 420).

As a result, if the performance models of all the target HW resources have been created for the target operation type (step 420: Yes), the performance model creation program 300 advances the process to step 410.

On the other hand, if the performance models of all the target HW resources have not been created (step 420: No), the performance model creation program 300 creates performance models of the uncreated HW resources (referred to as the target HW resources). Here, when creating a performance model of the target HW resource, a performance model is created by setting the HW resource other than target HW resource as an allocation amount that does not become a bottleneck in the performance of the target HW resource and gradually changing the HW resource allocation amount of the target HW resource.

First, the performance model creation program 300 changes the amount of HW resources allocated to the distributed data store (step 430). The HW resource allocation amount in the distributed data store is changed by cooperating with the resource allocation control program of each storage node. Specifically, the performance model creation program 300 transmits the HW resource allocation amount for the data store program of the distributed data store to the resource allocation control program of each storage node. As a result, the resource allocation control program receives the HW resource allocation amount and allocates the HW resources of the received HW resource allocation amount to the data store program. Allocation of HW resources in the storage node can be implemented by existing programs and software. For example, in a Linux operating system, a resource allocation function called Cgroups can be used. With Cgroups, a desired amount of HW resources can be allocated to a program running on the Linux operating system.

Next, the performance model creation program 300 instructs the benchmark program 310 of the benchmark execution node 210 to execute the performance measurement for the target operation type of the distributed data store (step 440). As a result, the benchmark program 310 executes the performance measurement of the distributed data store (specifically, the distributed data store program) and transmits the result of the performance measurement to the performance model creation program 300.

Next, the performance model creation program 300 determines whether the performance model can be created, specifically, whether the performance measurement has been performed the number of times required to create a performance model (step 450).

As a result, if the number of times required to create a performance model has not been completed (step 450: No), the performance model creation program 300 proceeds to step 430 and repeats the change of the HW resource allocation amount and the execution of the performance measurement. The number of times the performance measurement has been performed to create the performance model and the HW resource allocation amount to be changed for each performance measurement are predetermined.

On the other hand, if the number of measurements required to create a performance model has been performed (step 450: Yes), the performance model creation program 300 creates a performance model based on a plurality of measurement results, registers the created performance model in a performance model management table 510 (see FIG. 6) (step 460), and advances the process to step 420.

Here, the creation of the performance model and the registration of the performance model will be described.

Figures 5, 6:
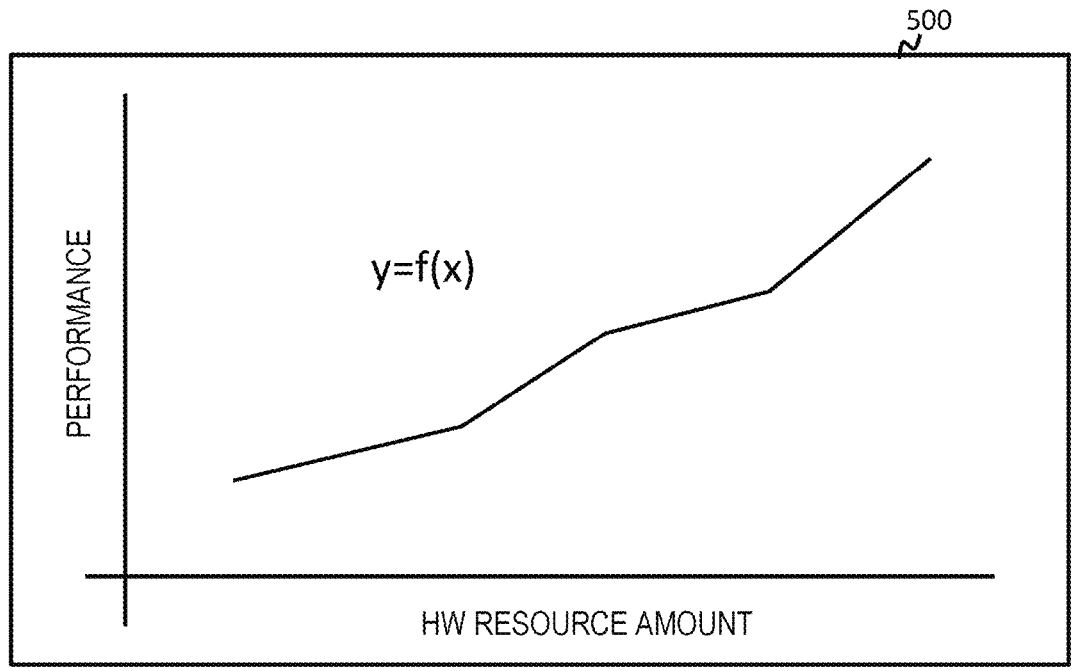
FIG. 5 is a diagram showing an outline of a performance model according to the first embodiment.
FIG. 6 is a configuration diagram of a performance model management table according to the first embodiment.

FIG. 5 is a diagram showing an outline of the performance model according to the first embodiment.

For the creation of the performance model, for example, as shown in FIG. 5, a graph 500 of performance with respect to a change in the amount of HW resources may be created and the approximate curve formula of the graph, $y=f(x)$ may be used as the performance model. Here, y indicates the performance of the distributed data store per node, and x indicates the amount of HW resources per node. y can be calculated by dividing the result of the performance measurement from the benchmark program 310 (the overall performance of the distributed data store) by the number of nodes in the distributed data store. In other words, multiplying y by the number of nodes in the distributed data store yields the overall performance of the distributed data store. The creation of graphs and the derivation of approximate curve formulas in the creation of performance models can be implemented by using existing spreadsheet software and programs.

FIG. 6 is a configuration diagram of the performance model management table according to the first embodiment.

The performance model is registered, for example, in the performance model management table 510. The row 511 of the performance model management table 510 stores information (distributed data store name) indicating the distributed data store corresponding to the performance model registered in the performance model management table 510. The column 512 stores the type of operation corresponding to the performance model. The row 513 stores the type of HW resource targeted by the performance model. In the cell corresponding to each operation type in the column 512 and the HW resource type in the row 513, the performance model for the HW resource type in the operation type is stored by the performance model creation program 300.

In the present embodiment, the formula (an example of the performance model) created based on the performance measurement result is stored. For example, a plurality of sets including the HW resource amount and the corresponding measured performance may be recorded.

Next, the resource allocation setting process will be described.

Figure 7:
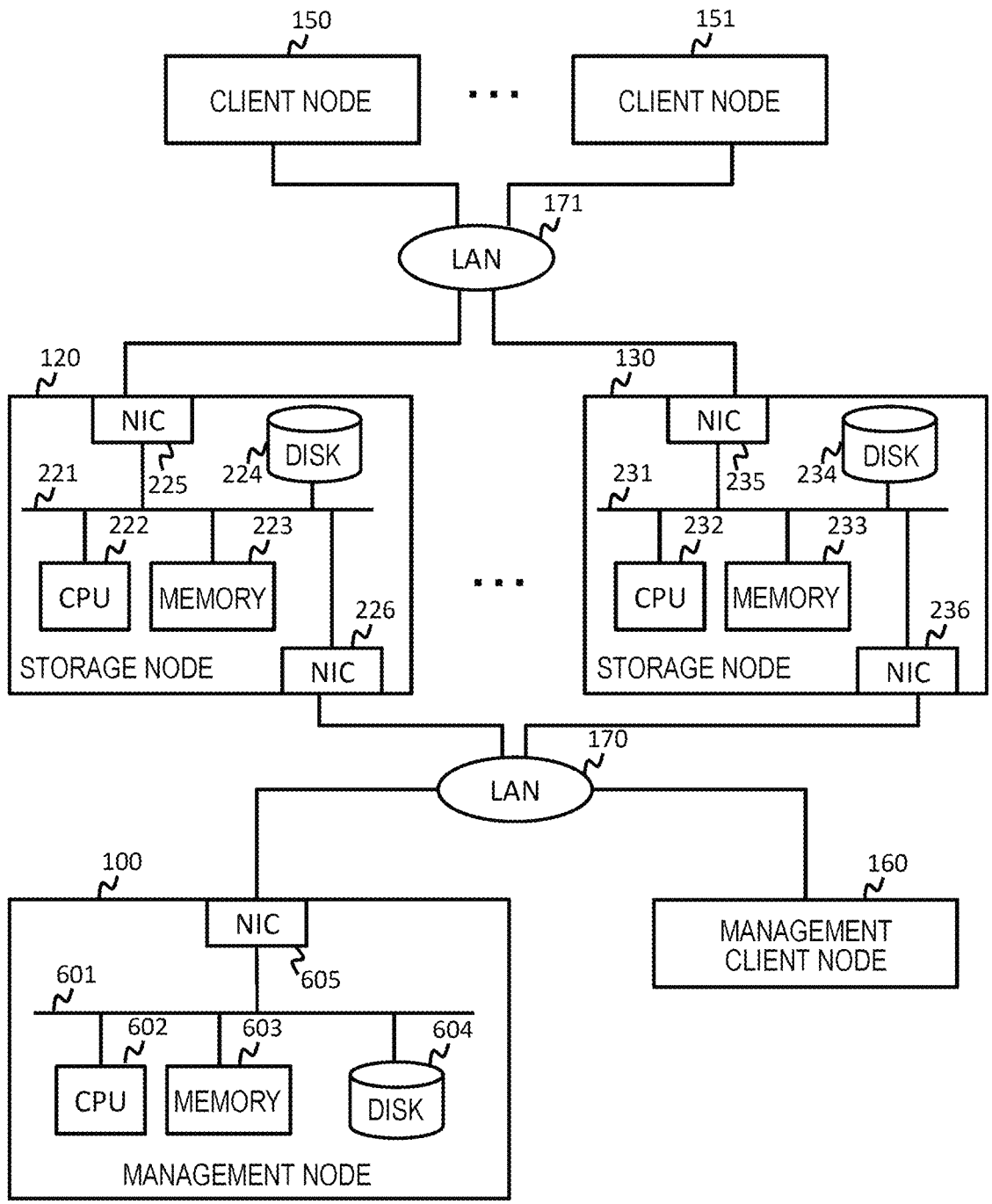
FIG. 7 is a hardware configuration diagram of components related to a resource allocation setting process according to the first embodiment.

FIG. 7 is a hardware configuration diagram of the components related to the resource allocation setting process according to the first embodiment.

In the present embodiment, among the components of the computer system 1, the storage nodes 120 and 130, the client nodes 150 and 151, the management node 100, and the management client node 160 are mainly involved in the resource allocation setting process.

The CPU 222 of the storage node 120 transmits and receives data to and from other devices (the storage node 130, the client nodes 150 and 151, and the like) connected to the LAN 171 via the bus 221 and the NIC 225. The CPU 222 of the storage node 120 transmits and receives data to and from another device (the management node 100 or the like) connected to the LAN 170 via the bus 221 and the NIC 226.

The CPU 232 of the storage node 130 transmits and receives data to and from other devices (the storage node 130, the client nodes 150 and 151, and the like) connected to the LAN 171 via the bus 231 and the NIC 235. The CPU 232 of the storage node 130 transmits and receives data to and from another device (the management node 100 or the like) connected to the LAN 170 via the bus 231 and the NIC 236.

The client node 150 and the client node 151 execute IO for the distributed data store configured in the storage nodes 120 and 130. Although not shown, each of the client nodes 150 and 151 includes a CPU, a memory, a NIC, and a disk device, which are connected via a bus. The CPU calls a program stored in the disk device into the memory and executes the program. The client nodes 150 and 151 transmit and receive data to and from other devices (the storage nodes 120 and 130, and the like) via the LAN 171.

Although not shown, the management client node 160 includes a CPU, a memory, a NIC, and a disk device, which are connected via a bus. The CPU calls a program stored in the disk device into the memory and executes the program. The management client node 160 transmits and receives data to and from another device (the management server 100, or the like) via the LAN 170.

The management node 100 includes a CPU 602 as an example of a processor, a memory 603 as a main storage device, a disk device 604 as a secondary storage device, and a NIC 605. The CPU 602, the memory 603, the disk device 604, and the NIC 605 are connected via a bus 601. Here, at least one of the memory 603 and the disk device 604 is an example of the storage unit.

The CPU 602 executes various processes by reading the program stored on the disk device 604 into the memory 603 and executing the program. The CPU 602 transmits and receives data to and from other devices (the storage nodes 120 and 130, the management client node 160, and the like) connected to the LAN 170 via the bus 601 and the NIC 605.

Figure 8:
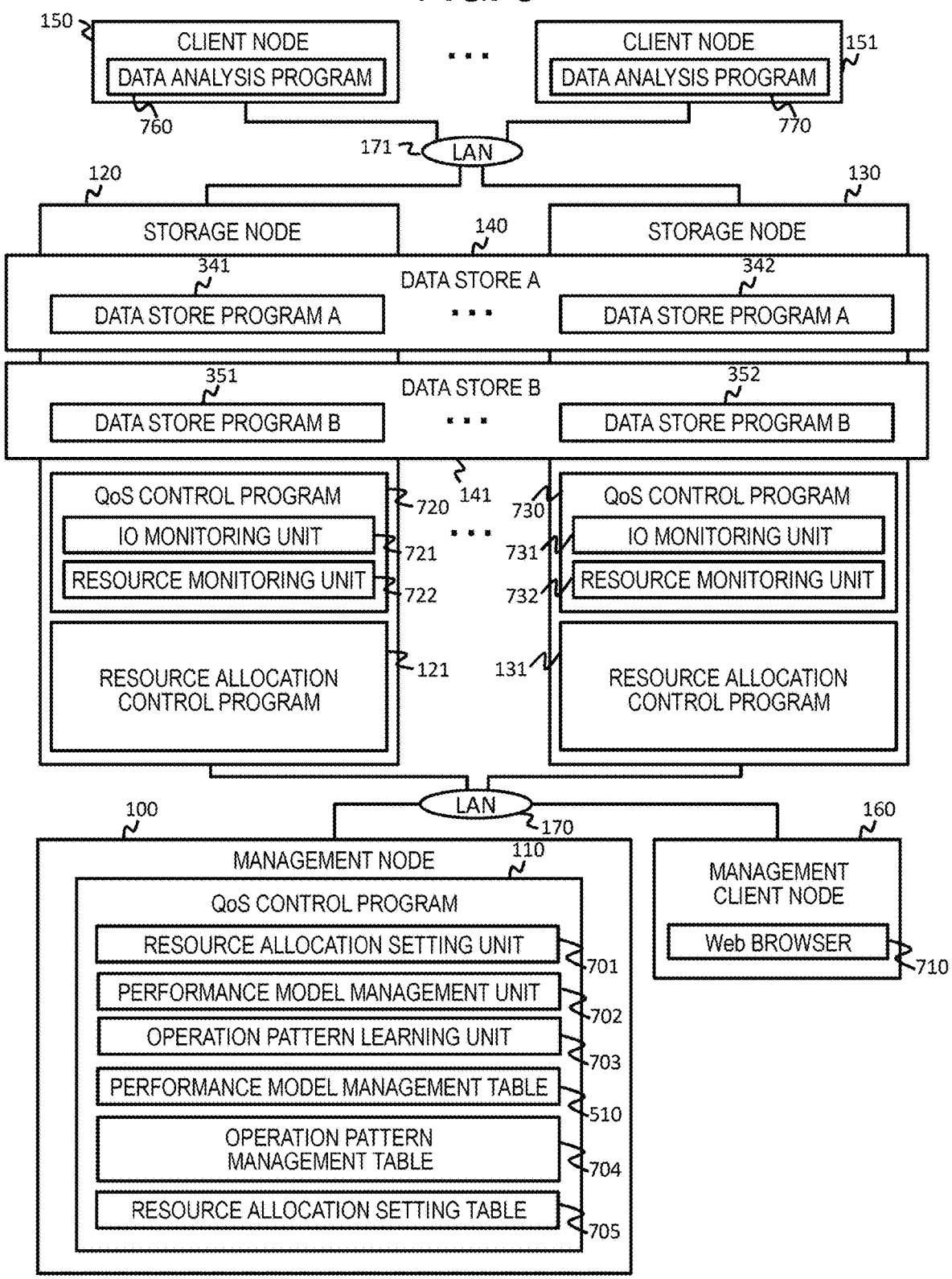
FIG. 8 is a logical configuration diagram of components related to the resource allocation setting process according to the first embodiment.

FIG. 8 is a logical configuration diagram of the components related to the resource allocation setting process according to the first embodiment. The same components as those shown in FIG. 3 are designated by the same reference numerals and the duplicate descriptions will be omitted.

The storage node 120 stores the data store program 341 (data store program A), the data store program 351 (data store program B), a QoS control program 720, and the resource allocation control program 121.

The storage node 130 stores the data store program 342 (data store program A), the data store program 352 (data store program B), a QoS control program 730, and the resource allocation control program 131.

The QoS control program 720 of the storage node 120 includes an IO monitoring unit 721 and a resource monitoring unit 722, and when executed by the CPU 222, monitors the IO processing and resource consumption of the data store programs 341 and 351.

The QoS control program 730 of the storage node 130 includes an IO monitoring unit 731 and a resource monitoring unit 732, and when executed by the CPU 232, monitors the IO processing and resource consumption of the data store programs 342 and 352.

The client node 150 stores a data analysis program 760. The data analysis program 760 is executed by the client node 150 to execute IO for the distributed data store configured with the storage nodes 120 and 130.

The client node 151 stores a data analysis program 770. The data analysis program 770 is executed by the client node 151, thereby executing IO for the distributed data store configured with the storage nodes 120 and 130.

The management client node 160 stores a web browser 710. The web browser 710 is executed by the management client node 160, thereby receiving the input of the target performance setting of the distributed data store from the administrator and transmitting the target setting to the management node 100.

The management node 100 stores the QoS control program 110. The QoS control program 110 includes a resource allocation setting unit 701, a performance model management unit 702, an operation pattern learning unit 703, the performance model management table 510, an operation pattern management table 704, and a resource allocation setting table 705. Although omitted in the drawing, the QoS control program 110 includes performance model management tables 510 as many as the number of distributed data stores executed by the storage nodes.

The resource allocation setting unit 701 is executed by the CPU 602 of the management node 100, thereby receiving the target performance of the distributed data store input via the web browser 710. Based on the received target performance and the contents of the performance model management table 510, the resource allocation setting unit 701 updates the resource allocation setting table 705 and transmits the set value of the resource allocation amount to the storage nodes 120 and 130.

The performance model management unit 702 is executed by the CPU 602, thereby receiving the monitoring results of the IO processing and resource consumption of the data store programs 341, 342, 351, and 352 from the QoS control programs 720 and 730 executed by the storage nodes 120 and 130 and modifying the performance model based on the monitoring results. The performance model management unit 702 updates the resource allocation setting table 705 based on the modified performance model and transmits the set value of the resource allocation amount to the storage nodes 120 and 130.

The operation pattern learning unit 703 is executed by the CPU 602, thereby receiving the monitoring result of the IO processing of the data store programs 341, 342, 351, and 352 from the QoS control programs 720 and 730 executed by the storage nodes 120 and 130. Then, based on the monitoring result, the operation pattern learning unit 703 learns the operation executed in the distributed data store and updates the operation pattern management table 704. The operation pattern learning unit 703 updates the resource allocation setting table 705 based on the operation pattern management table 704 and transmits the set value of the resource allocation amount to the storage nodes 120 and 130.

Next, the resource allocation setting process 800 for setting the allocation of HW resources to the data store will be described.

Figure 9:
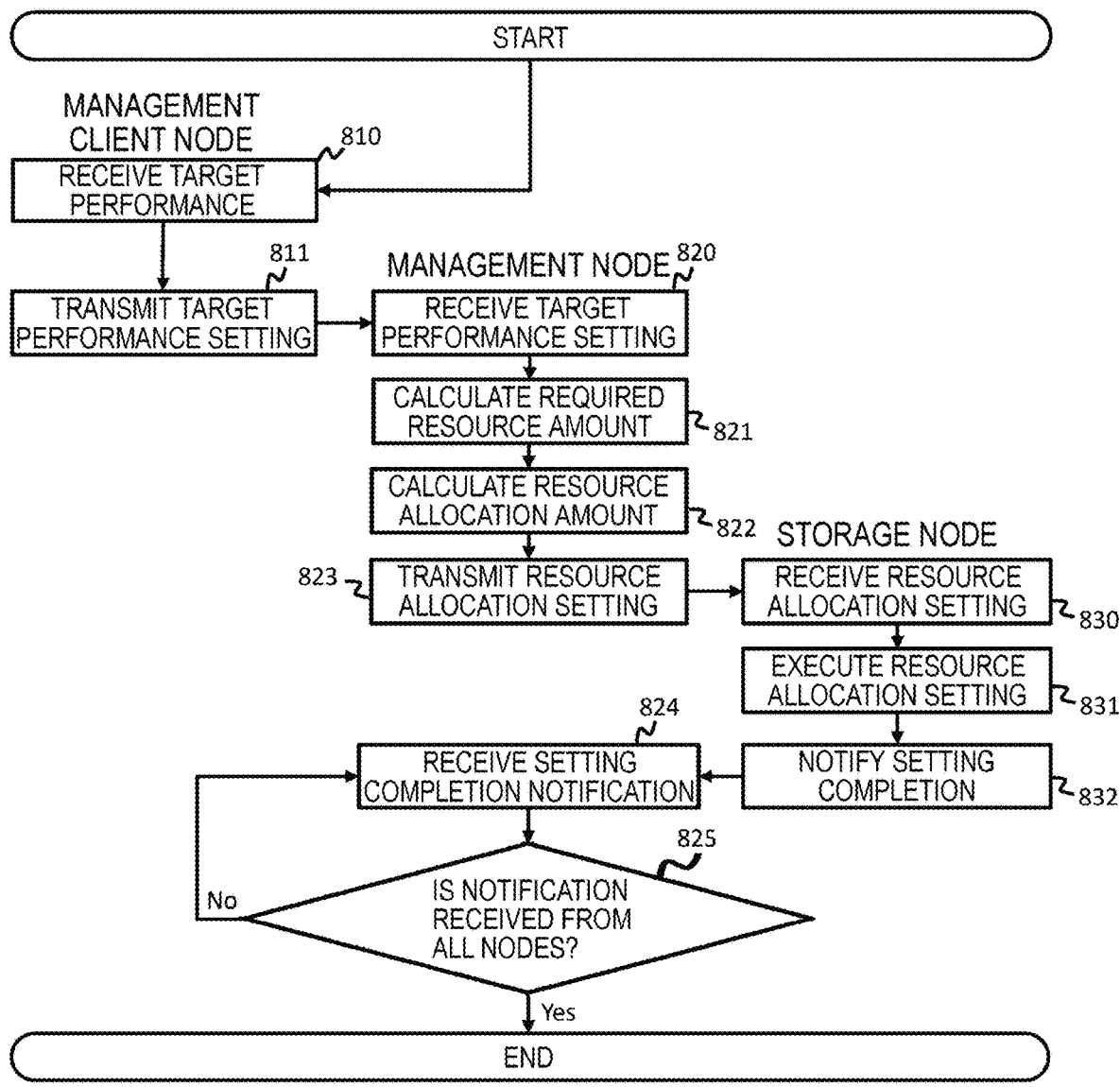
FIG. 9 is a flowchart of the resource allocation setting process according to the first embodiment.

FIG. 9 is a flowchart of the resource allocation setting process according to the first embodiment.

The web browser 710 of the management client node 160 displays a GUI screen 900 for inputting target performance (see FIG. 10) and receives the target performance of each distributed data store from the data lake administrator (step 810).

Here, the GUI screen 900 for inputting target performance will be described.

Figure 10:
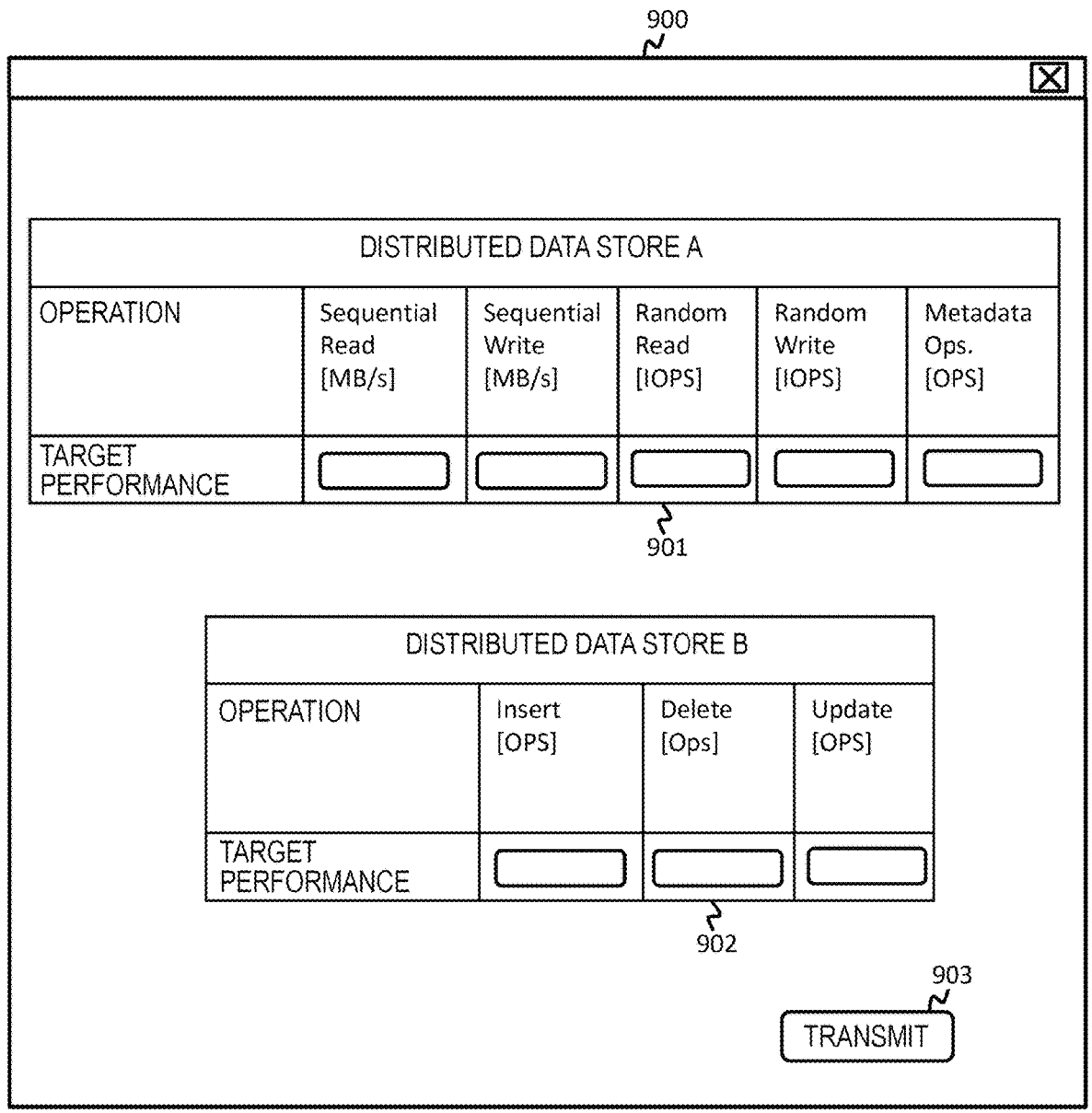
FIG. 10 is a diagram showing a graphical user interface (GUI) screen for inputting target performance according to the first embodiment.

FIG. 10 is a diagram showing a GUI screen for inputting target performance according to the first embodiment.

The GUI screen 900 for inputting target performance includes target performance input fields (input fields 901 and 902) for each distributed data store and a send button 903. The GUI screen 900 for inputting target performance shown in FIG. 10 shows an input field when there are two distributed data stores, the distributed data store A and the distributed data store B, but the number of input fields is prepared as many as the number of distributed data stores on the storage node. The input fields 901 and 902 include input fields for inputting the target performance for each type of operation in the distributed data store. The administrator may enter the target performance for each type of operation of the distributed data store in the input field. The send button 903 is a button that receives an instruction to transmit the setting of the target performance input in the input fields 901 and 902 to the management node 100. When the send button 903 is pressed, the management client node 160 transmits the target performance setting input in the input fields 901 and 902 to the management node 100.

Referring back to the description of FIG. 9, when the send button 903 of the GUI screen 900 for inputting the target performance is pressed by the data lake administrator, the web browser 710 transmits the setting of the target performance (target performance setting) input in the input fields 901 and 902 to the management node 100 (step 811).

Next, the resource allocation setting unit 701 of the management node 100 receives the transmitted target performance setting (step 820). The resource allocation setting unit 701 registers the received target performance in the resource allocation setting table 705 (see FIG. 11).

FIG. 11 is a configuration diagram of the resource allocation setting table according to the first embodiment.

The resource allocation setting table 705 is provided for each distributed data store configured in the storage node and manages the settings of the relationship between the target performance and the required HW resource amount for each operation type of the distributed data store and the resource allocation amount to the distributed data store. The row 1001 of the resource allocation setting table 705 stores information (distributed data store name) indicating the distributed data store corresponding to the resource allocation setting table 705. The row 1002 stores the operation type of the distributed data store. The row 1003 stores the target performance for each type of operation. The row 1004 stores the amount of resources required for the target performance for each operation type for each HW resource. The column 1005 stores the set value of the resource allocation amount for the distributed data store (distributed data store program).

Referring back to the description of FIG. 9, next, the resource allocation setting unit 701 refers to the performance model management table 510 and calculates the amount of HW resources (resource allocation amount) actually allocated to the distributed data store. Here, the calculated HW resource amount is the HW resource amount allocated to the data store program of the distributed data store in each storage node.

First, the resource allocation setting unit 701 calculates the HW resource amount required for each operation type in order to achieve the target performance from the performance model (formula) recorded in the performance model management table 510 and the target performance of each operation type, and registers the calculated HW resource amount in the row 1004 of the resource allocation setting table 705 (step 821). Specifically, the resource allocation setting unit 701 divides the target performance of each operation type by the number of storage nodes constituting the distributed data store and substitutes y of the performance model formula (y=f (x)) with the result to calculate the required HW resource amount x. If a plurality of sets including the HW resource amount and the measured performance are recorded instead of the performance model, the amount of HW resource required for the target performance can be calculated based on the plurality of sets.

Next, the resource allocation setting unit 701 calculates the resource allocation amount (step 822). Specifically, the resource allocation setting unit 701 refers to the row 1004 of the resource allocation table 705 and confirms the required HW resource amount for each HW resource for each operation type. Next, the resource allocation setting unit 701 determines the maximum value of the required HW resource amount as the resource allocation amount and registers the determined value in the corresponding column of the HW resource in the column 1005. Here, the maximum value of the required HW resource amount is set as the resource allocation amount in order to ensure that the target performance can be achieved regardless of which operation is executed in the distributed data store.

If multiple types of operations are executed at the same time and it is necessary to achieve the target performance in the multiple types of operations, the total value of the HW resource amounts required for those types of operations may be used as the resource allocation amount. Whether the maximum value of the required HW resource amount is the resource allocation amount or the total value of the plurality of required HW resource amounts is the resource allocation amount may be determined according to a preset QoS policy.

Next, the resource allocation setting unit 701 transmits the contents of the column 1005 of the resource allocation setting table 705, that is, the resource allocation amount for each HW resource to the resource allocation control programs 121 and 131 of the storage nodes 120 and 130 (step 823).

The resource allocation control programs 121 and 131 of the storage nodes 120 and 130 receive the contents of the column 1005 of the resource allocation setting table 705 (step 830), and sets to allocate HW resources to the data store program of the distributed data store based on the resource allocation amount for each HW resource of the column 1005 (step 831).

When the allocation setting is completed, the resource allocation control programs 121 and 131 transmit a notification (setting completion notification) indicating that the setting has been completed to the resource allocation setting unit 701 of the management node 100 (step 832).

The resource allocation setting unit 701 of the management node 100 receives the setting completion notification (step 824) and checks whether the setting completion notification has been received from all the storage nodes that have transmitted the resource allocation amount for each HW resource (step 825). If the setting completion notification has not been received from all the storage nodes (step 825: No), the resource allocation setting unit 701 advances the process to step 824, whereas if the setting completion notification has been received from all the storage nodes (step 825: Yes), the resource allocation setting unit 701 ends the resource allocation setting process 800.

Next, a performance model modification and setting update process 1100 that modifies the performance model and resets the resource allocation based on the modified performance model will be described.

Figure 12:
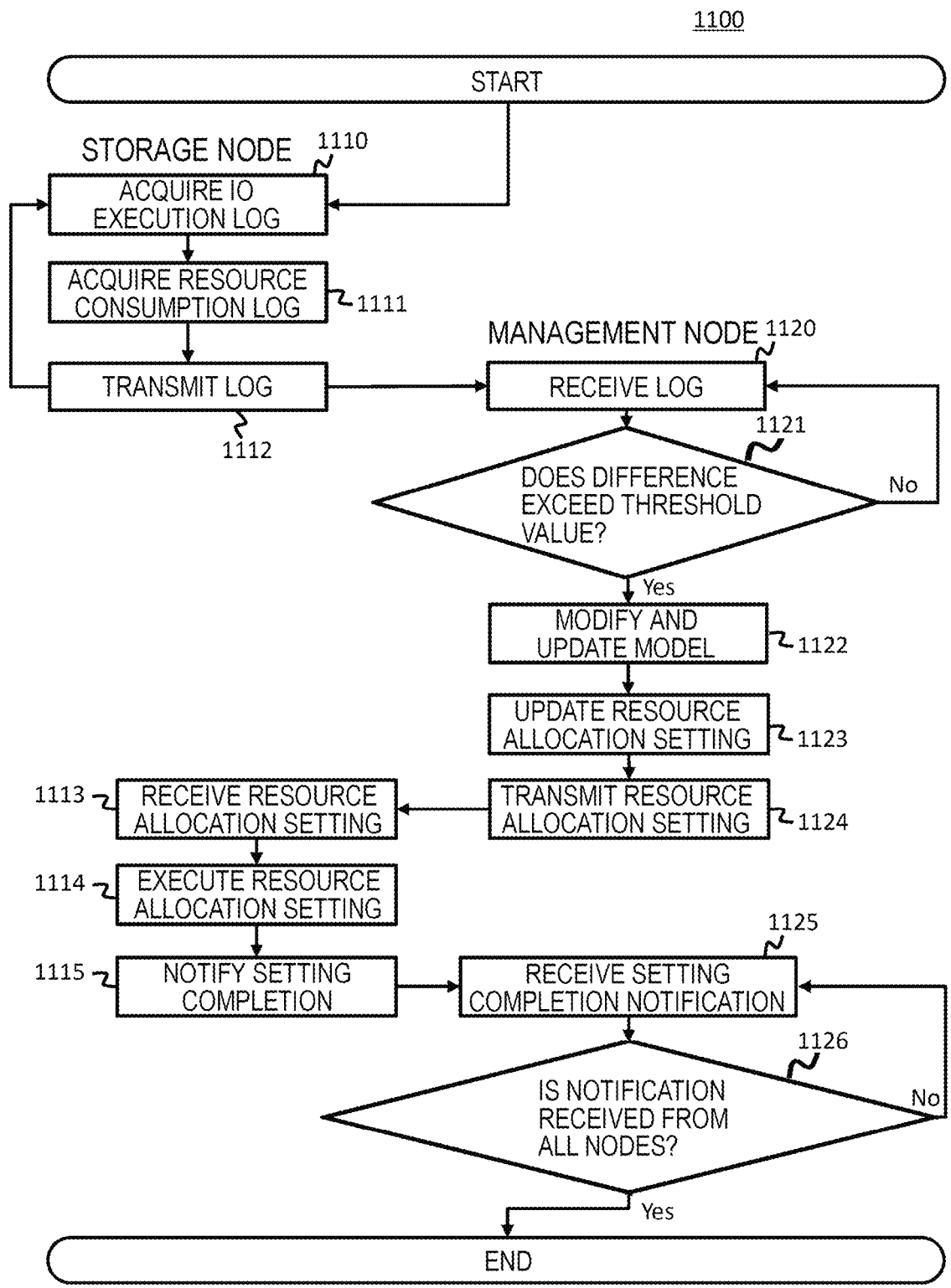
FIG. 12 is a flowchart of a performance model modification and setting update process according to the first embodiment.

FIG. 12 is a flowchart of the performance model modification and setting update process according to the first embodiment.

The performance model correction and setting update process is executed periodically, for example. First, the IO monitoring units 721 and 731 of the QoS control programs 720 and 730 of the storage nodes 120 and 130 acquire the IO execution log of the data store program of each distributed data store (step 1110). Here, the contents of the IO operation executed by the data store program 341, 342, 351, and 352, the timing at which the IO operation is executed, the processing time, and the like are recorded in the IO execution log. Next, the resource monitoring units 722 and 732 acquire a log (resource consumption log) of the amount of HW resources consumed by the data store programs 341, 342, 351, and 352 of each distributed data store (step 1111). The resource consumption log can be acquired by using the function of an operating system (OS) or the like.

Next, the QoS control programs 720 and 730 transmit the acquired IO execution log and resource consumption log to the performance model management unit 702 of the management node 100 (step 1112).

The performance model management unit 702 of the management node 100 receives the IO execution log and the resource consumption log transmitted from each of the storage nodes 120 and 130 (step 1120).

Next, the performance model management unit 702 acquires the actual performance of the distributed data store from the IO execution log and compares the actual performance with the performance estimated by the performance model (estimated performance) to determine whether the difference between the actual performance and the estimated performance exceeds a predetermined threshold value set in advance (step 1121). As a result, if the difference between the actual performance and the estimated performance does not exceed the predetermined threshold value (step 1121: No), the performance model management unit 702 advances the process to step 1120. On the other hand, if the difference between the actual performance and the estimated performance exceeds the predetermined threshold value (step 1121: Yes), the performance model management unit 702 performs a process of modifying the performance model and updates the performance model of the performance model management table 510 to the modified performance model (step 1122). The process of modifying the performance model can be implemented by the same process as the performance model creation process 400 based on the acquired resource consumption log and the performance value acquired from the IO execution log.

Next, the performance model management unit 702 performs a process of calculating a new resource allocation amount based on the updated performance model of the performance model management table 510 and updates the resource allocation setting table 705 (step 1123). The process of calculating a new resource allocation amount can be implemented by the same process as the resource allocation setting process 800.

Next, the performance model management unit 702 transmits the contents of the column 1005 of the resource allocation setting table 705, that is, the resource allocation amount for each HW resource to the resource allocation control programs 121 and 131 of the storage nodes 120 and 130 (step 1124).

The resource allocation control programs 121 and 131 of the storage nodes 120 and 130 receive the contents of the column 1005 of the resource allocation setting table 705 (step 1113), and sets to allocate HW resources to the data store program of the distributed data store based on the resource allocation amount for each HW resource of the column 1005 (step 1114).

When the allocation setting is completed, the resource allocation control programs 121 and 131 transmit a notification indicating that the setting has been completed (setting completion notification) to the performance model management unit 702 of the management node 100 (step 1115).

The performance model management unit 702 of the management node 100 receives the setting completion notification (step 1125) and checks whether the setting completion notification has been received from all the storage nodes that have transmitted the resource allocation amount for each HW resource (step 1126). If the setting completion notification has not been received from all the storage nodes (step 1126: No), the performance model management unit 702 advances the process to step 1125, whereas if the setting completion notification has been received from all the storage nodes (step 1126: Yes), the performance model management unit 702 ends the performance model modification and setting update process 1100.

According to the performance model modification and setting update process 1100, it is possible to update to an appropriate performance model according to the actual situation of IO processing of each storage node 120 and 130 and it is possible to appropriately allocate HW resources according to the actual situation.

Next, the operation pattern learning process 1200 for learning the execution pattern of the operation in the distributed data store will be described.

Figure 13:
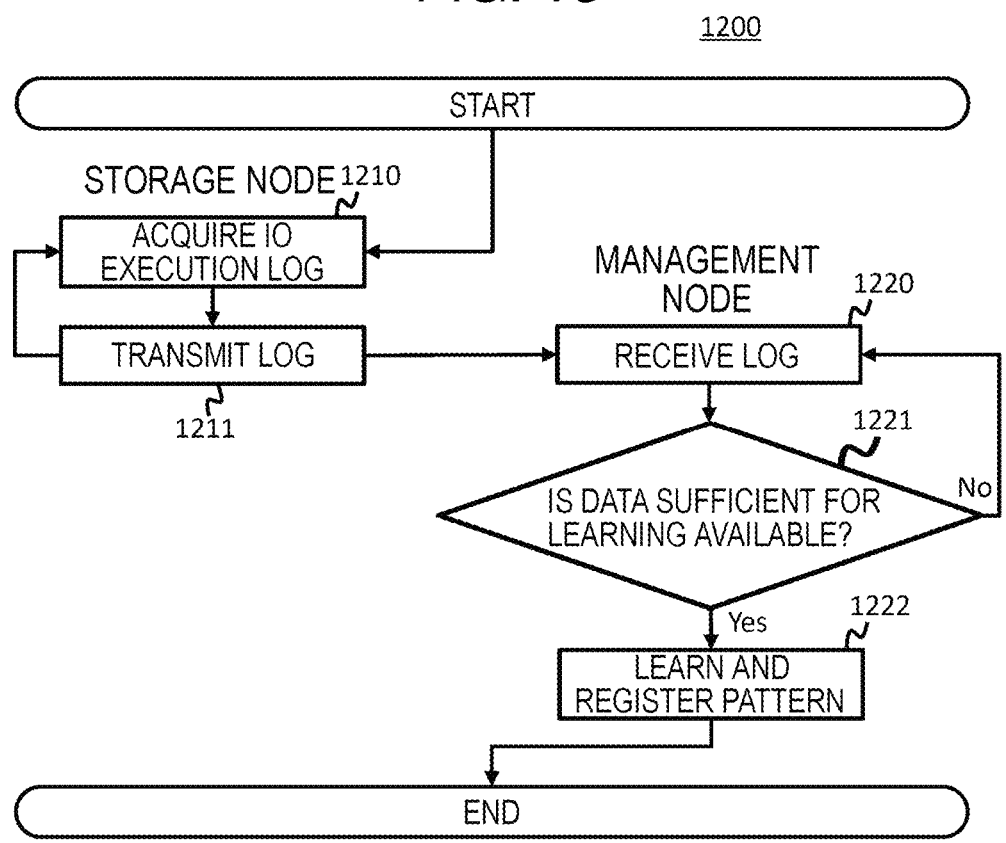
FIG. 13 is a flowchart of an operation pattern learning process according to the first embodiment.

FIG. 13 is a flowchart of the operation pattern learning process according to the first embodiment.

First, the IO monitoring units 721 and 731 of the QoS control programs 720 and 730 of the storage nodes 120 and 130 acquire the IO execution log of the data store program of each distributed data store (step 1210). Next, the QoS control programs 720 and 730 transmit the acquired IO execution log to the operation pattern learning unit 703 of the management node 100 (step 1211).

The operation pattern learning unit 703 of the management node 100 receives the IO execution log transmitted from the storage nodes 120 and 130 (step 1220).

Next, the operation pattern learning unit 703 confirms the received IO execution log and reverses whether sufficient data for learning is available (step 1221). Here, the criteria for determining whether sufficient data for learning is available depends on the learning method of the execution pattern adopted in step 1222 described later. As a result, if sufficient data for learning is not available (step 1221: No), the operation pattern learning unit 703 advances the process to step 1220. On the other hand, if sufficient data for learning is available (step 1221: Yes), the operation pattern learning unit 703 learns the operation execution pattern, registers the operation execution pattern in the operation pattern management table 704 (see FIG. 14) (step 1222), and ends the operation pattern learning process 1200.

Figure 14:
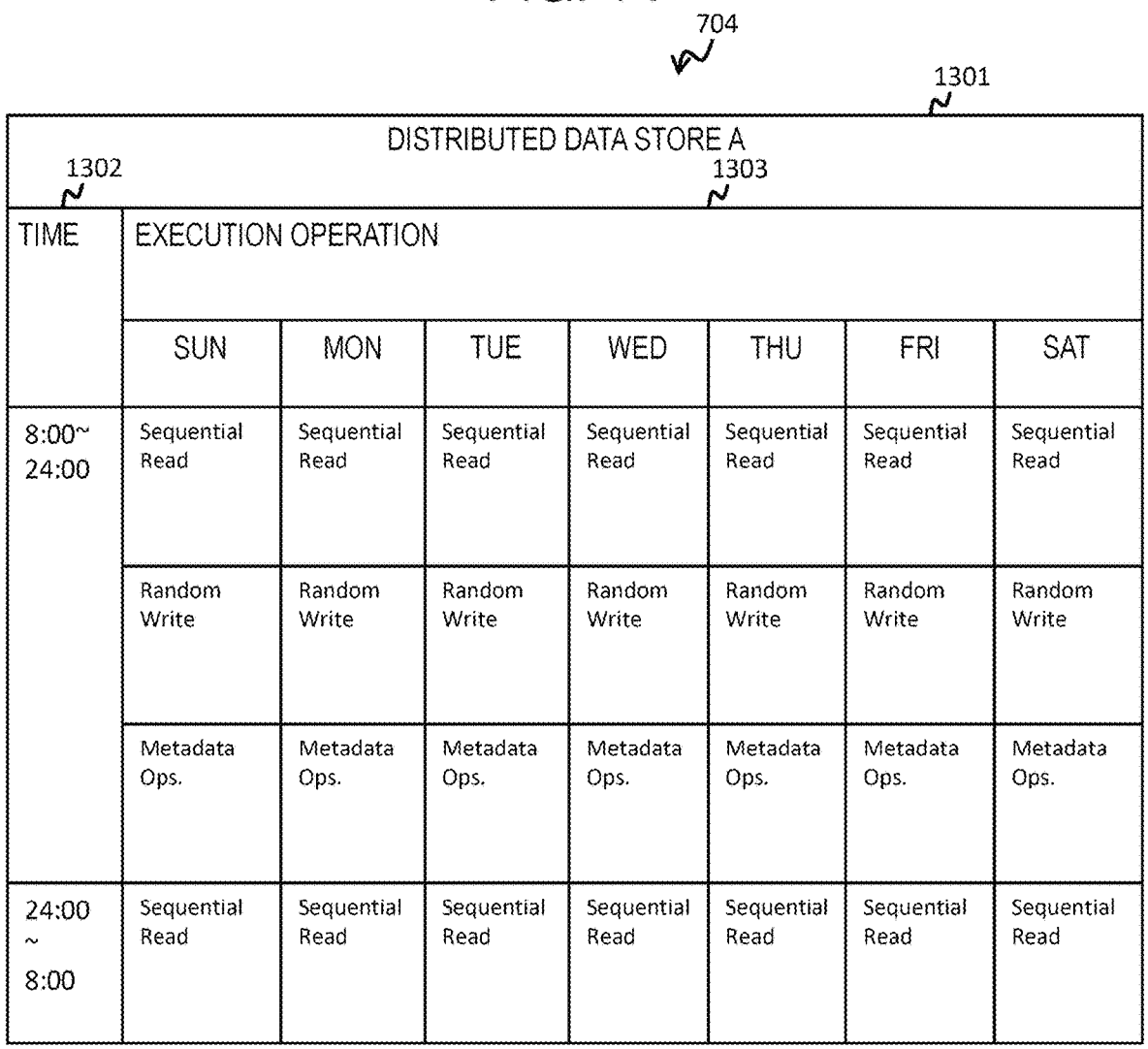
FIG. 14 is a configuration diagram of an operation pattern management table according to the first embodiment.

FIG. 14 is a configuration diagram of an operation pattern management table according to the first embodiment.

The operation pattern management table 704 is provided for each distributed data store and stores the types of operations to be executed at each timing (day of the week, time, and the like) for the distributed data store. The row 1301 of the operation pattern management table 704 stores information (distributed data store name) indicating the distributed data store corresponding to the operation pattern management table 704. The column 1302 stores the time (duration) during the operation is executed. The column 1303 records the type of operation executed at the corresponding time. In the example of FIG. 14, the column 1303 records the type of operation executed on each day of the week, including the corresponding column for each day of the week. Here, in the distributed data store, an existing method such as machine learning can be used as a learning method for the type of operation executed at each timing.

Next, the setting update process 1400 based on the operation pattern will be described.

Figure 15:
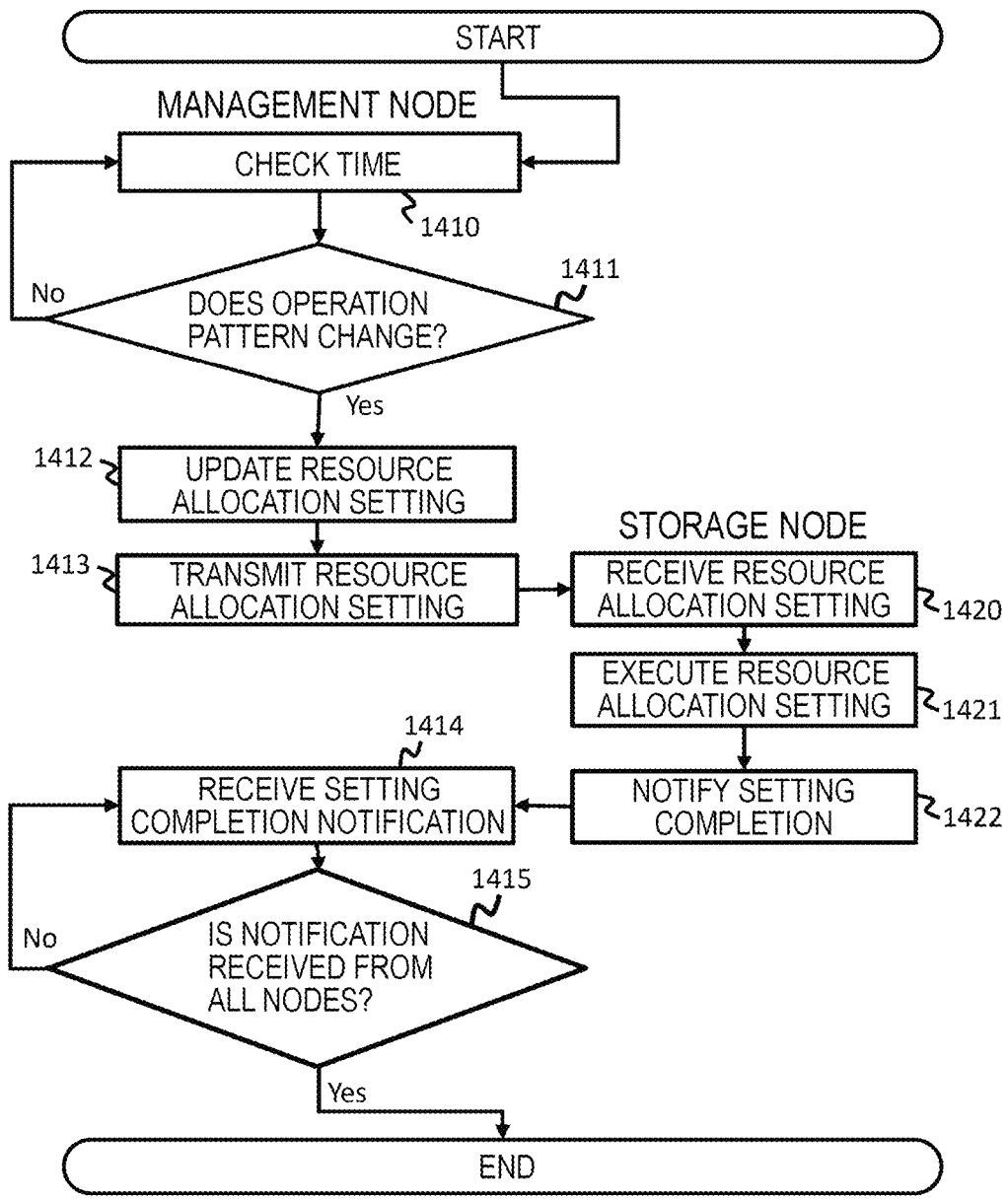
FIG. 15 is a flowchart of a setting update process based on an operation pattern according to the first embodiment.

FIG. 15 is a flowchart of the setting update process based on the operation pattern according to the first embodiment. FIG. 16 is a diagram illustrating an outline of updating the resource allocation setting table according to the first embodiment.

First, the operation pattern learning unit 703 of the management node 100 checks the current time (step 1410). The check of the current time can be implemented by using, for example, an OS function or the like.

Next, the operation pattern learning unit 703 compares the current time with the contents of the row 1302 of the operation pattern management table 704 and checks whether the current time is the timing when the execution pattern of the operation changes (step 1411). As a result, if it is not the timing when the execution pattern of the operation changes (step 1411: No), the operation pattern learning unit 703 advances the process to step 1410.

On the other hand, if the current timing is the timing when the operation execution pattern changes (step 1411: Yes), the operation pattern learning unit 703 updates the resource allocation setting table 705 (step 1412). As a method of updating the resource allocation setting table 705, the HW resource allocation amount is calculated excluding the types of operations that are not executed in the next execution pattern. Specifically, as shown in FIG. 16, when only the operation type of sequential read is executed as the next execution pattern, 0.5 cores of HW resource amount that is necessary for the type of operation to be executed is calculated as the CPU allocation amount and the cell 1500 of the resource allocation setting table 705 is updated.

Next, the operation pattern learning unit 703 transmits the updated contents of the resource allocation setting table 705, that is, the resource allocation amount for each HW resource to the resource allocation control programs 121 and 131 of the storage nodes 120 and 130 (step 1413).

The resource allocation control programs 121 and 131 of the storage nodes 120 and 130 receive the contents of the column 1005 of the resource allocation setting table 705 (step 1420), and sets to allocate HW resources to the data store program of the distributed data store based on the resource allocation amount for each HW resource in the column 1005 (step 1421).

When the allocation setting is completed, the resource allocation control programs 121 and 131 transmit a notification (setting completion notification) indicating that the setting has been completed to the operation pattern learning unit 703 of the management node 100 (step 1422).

The operation pattern learning unit 703 of the management node 100 receives the setting completion notification (step 1414) and checks whether the setting completion notification has been received from all the storage nodes that have transmitted the resource allocation amount for each HW resource (step 1415). If the setting completion notification has not been received from all the storage nodes (step 1415: No), the operation pattern learning unit 703 advances the process to step 1414, whereas the setting completion notification has been received from all the storage nodes (step 1415: Yes), the operation pattern learning unit 703 ends the setting update process 1400 based on the operation pattern.

According to the setting update process 1400 based on the operation pattern, it is not necessary to allocate the HW resource required by the operation type that is not executed in the operation type of the distributed data store and the HW resource can be appropriately allocated.

Next, a computer system according to a second embodiment will be described.

The computer system according to the first embodiment controls the HW resource amount for the data store programs constituting the distributed data store, but the computer system according to the second embodiment controls the HW resource amount for an application (also referred to as an app) as an example of a program (software) executed on one or plural nodes.

The computer system according to the second embodiment includes a management node 2000 (see FIG. 23) instead of the management node 100 in the computer system 1 according to the first embodiment shown in FIG. 1, client nodes 2040 and 2050 (see FIG. 23) instead of the client nodes 150 and 151, app execution nodes 1620 and 1630 (see FIG. 17) as examples of an execution node instead of storage nodes 120 and 130, a management client node 2010 (see FIG. 23) instead of the management client node 160, a performance model creation node 1600 (see FIG. 17) as an example of the creation node instead of the performance model creation node 200, and a benchmark execution node 1610 (see FIG. 17) instead of the benchmark execution node 210.

Next, QoS control for the application executed on the app execution nodes 1620 and 1630 will be described.

Figure 17:
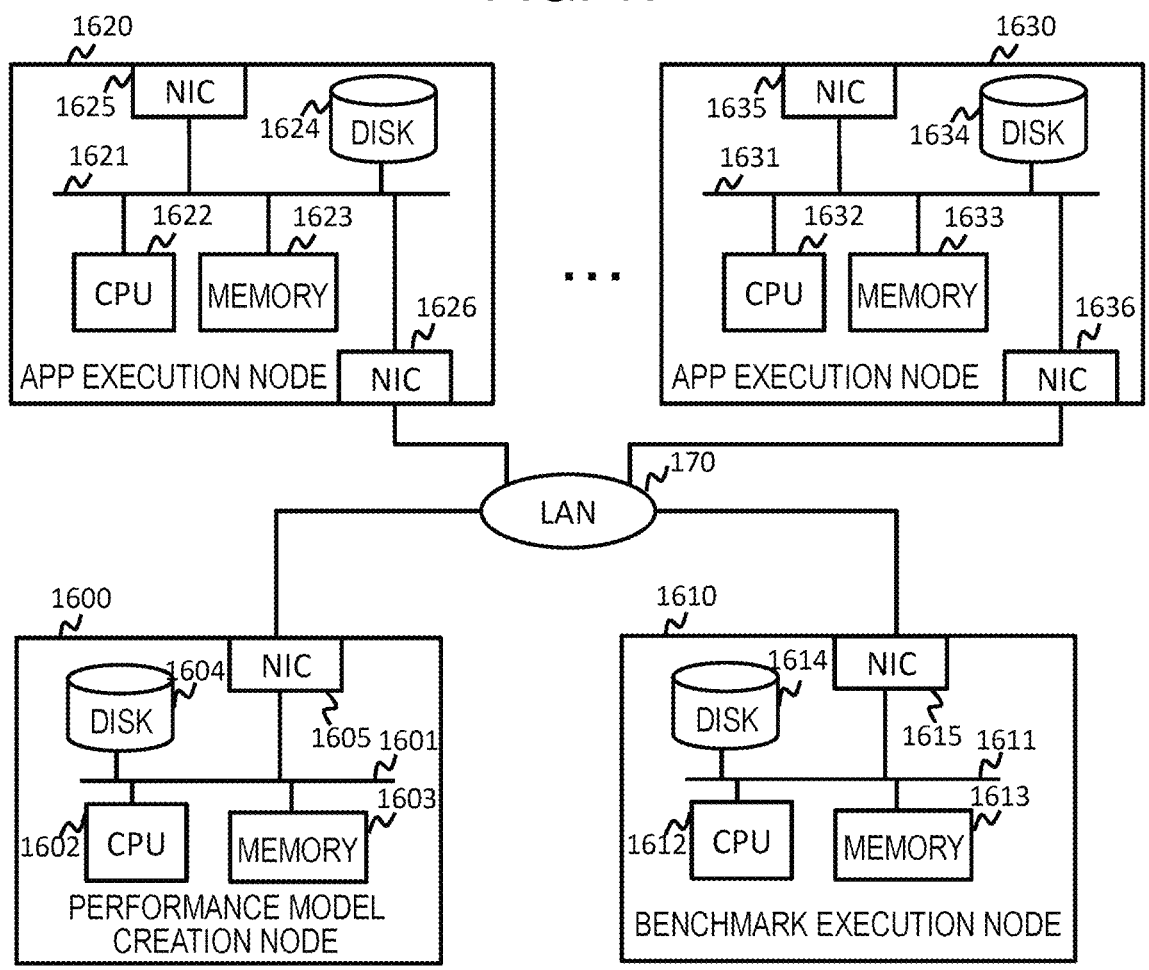
FIG. 17 is a hardware configuration diagram of components related to a performance model creation process in a computer system according to a second embodiment.

FIG. 17 is a hardware configuration diagram of components related to the performance model creation process in the computer system according to the second embodiment.

In the present embodiment, among the components of the computer system, the performance model creation node 1600, the benchmark execution node 1610, the app execution node 1620, and the app execution node 1630 are mainly involved in the performance model creation process.

In the present embodiment, in the performance model creation process, the app execution nodes 1620 and 1630 that constitute the app finally provided to the client node are used, but the present invention is not limited thereto and a plurality of similar app execution nodes different from the app execution nodes 1620 and 1630 may be used.

The app execution node 1620 includes a CPU 1622 as an example of a processor, a memory 1623 as a main storage device, a disk device 1624 as a secondary storage device, and NICs 1625 and 1626. The CPU 1622, the memory 1623, the disk device 1624, and the NICs 1625 and 1626 are connected via a bus 1621.

The CPU 1622 executes various processes by reading the program stored on the disk device 1624 into the memory 1623 and executing the program. The CPU 1622 transmits and receives data to and from other devices (the app execution node 1630, the performance model creation node 1600, the benchmark execution node 1610, and the like) connected to the LAN 170 via the bus 1621 and the NIC 1626.

The app execution node 1630 includes a CPU 1632 as an example of a processor, a memory 1633 as a main storage device, a disk device 1634 as a secondary storage device, and NICs 1635 and 1636. The CPU 1632, the memory 1633, the disk device 1634, and the NICs 1635 and 1636 are connected via a bus 1631.

The CPU 1632 executes various processes by reading the program stored on the disk device 1634 into the memory 1633 and executing the program. The CPU 1632 transmits and receives data to and from other devices (the app execution node 1620, the performance model creation node 1600, the benchmark execution node 1610, and the like) connected to the LAN 170 via the bus 1631 and the NIC 1636.

The performance model creation node 1600 includes a CPU 1602 as an example of a processor, a memory 1603 as a main storage device, a disk device 1604 as a secondary storage device, and a NIC 1605. The CPU 1602, the memory 1603, the disk device 1604, and the NIC 1605 are connected via a bus 1601.

The CPU 1602 executes various processes by reading the program stored on the disk device 1604 into the memory 1603 and executing the program. The CPU 2602 transmits and receives data to and from other devices (the app execution nodes 1620 and 1630, the benchmark execution node 1610, and the like) connected to the LAN 170 via the bus 1601 and the NIC 1605.

The benchmark execution node 1610 includes a CPU 1612 as an example of a processor, a memory 1613 as a main storage device, a disk device 1614 as a secondary storage device, and a NIC 1615. The CPU 1612, the memory 1613, the disk device 1614, and the NIC 1615 are connected via a bus 1611.

The CPU 1612 executes various processes by reading the program stored on the disk device 1614 into the memory 1613 and executing the program. The CPU 1612 transmits and receives data to and from other devices (the app execution nodes 1620 and 1630, the performance model creation node 1600, and the like) connected to the LAN 170 via the bus 1611 and the NIC 1615.

Figure 18:
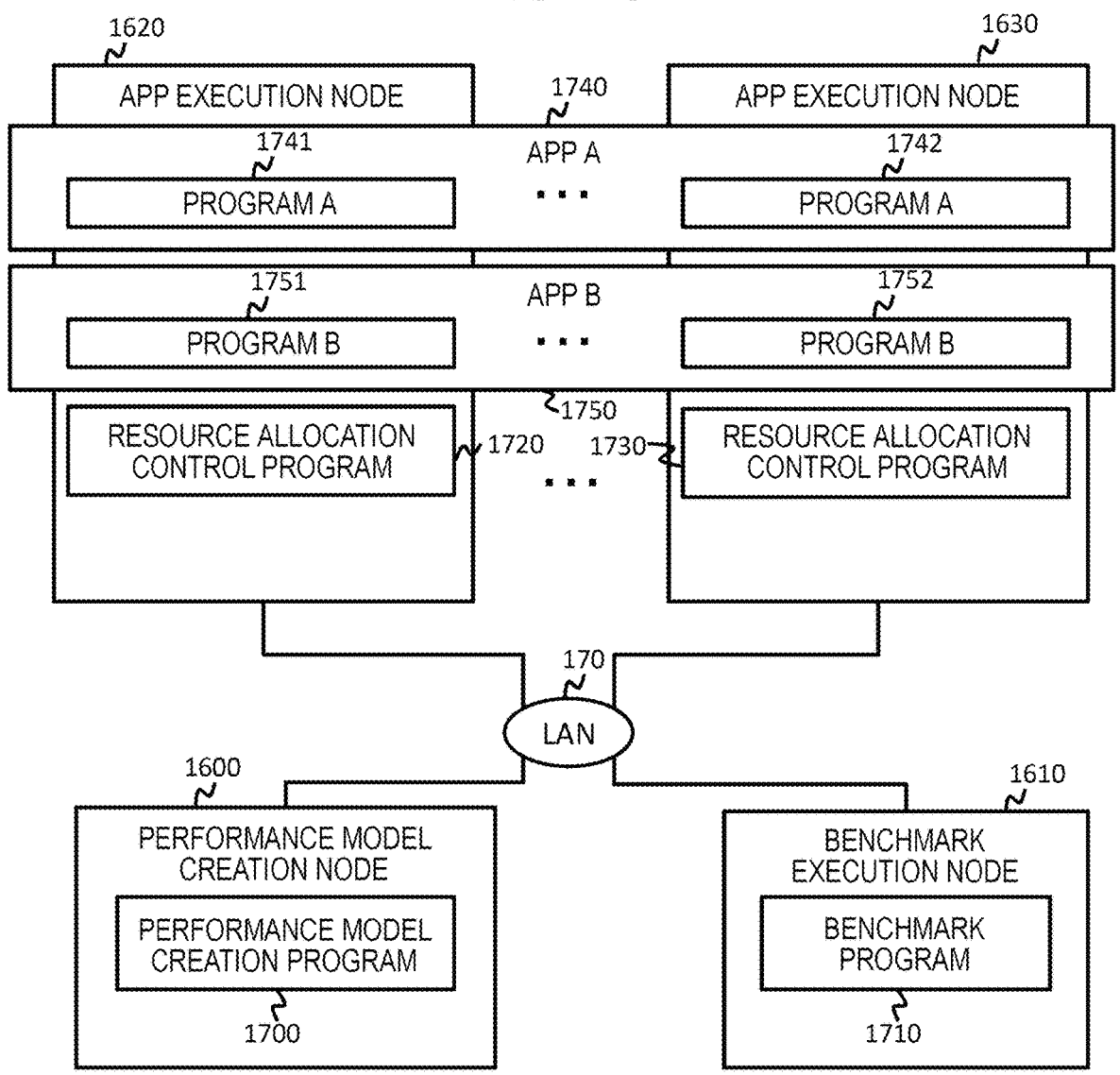
FIG. 18 is a logical configuration diagram of components related to the performance model creation process according to the second embodiment.

FIG. 18 is a logical configuration diagram of components related to the performance model creation process according to the second embodiment.

The app execution node 1620 stores a program 1741 (program A) for the application, a program 1751 (program B) for the application, and a resource allocation control program 1720.

The app execution node 1630 stores a program 1742 (program A) for the application, a program 1752 (program B) for the application, and a resource allocation control program 1730.

The program 1741 executed by the CPU 1622 of the app execution node 1620 and the program 1742 executed by the CPU 1632 of the app execution node 1630 operate in cooperation with each other to constitute the application 1740 (app A). The program 1751 executed by the CPU 1622 of the app execution node 1620 and the program 1752 executed by the CPU 1632 of the app execution node 1630 operate in cooperation with each other to constitute the application 1750 (app B). Although the drawing shows an example in which the programs of a plurality of app execution nodes operate the application in cooperation with each other, the programs of each app execution node may independently constitute the application.

When executed by the CPU 1622, the resource allocation control program 1720 controls the amount of HW resources (HW resource allocation amount) allocated to each program executed by the app execution node 1620.

When executed by the CPU 1632, the resource allocation control program 1730 controls the HW resource allocation amount allocated to each program executed by the storage node 1630.

The performance model creation node 1600 stores the performance model creation program 1700. When executed by the CPU 1602, the performance model creation program 1700 creates a performance model of the apps 1740 and 1750 configured on the app execution nodes 1620 and 1630.

The benchmark execution node 1610 stores the benchmark program 1710. When executed by the CPU 1612, the benchmark program 1710 measures the performance of the apps 1740 and 1750 configured on the app execution nodes 1620 and 1630.

Next, the performance model creation process 1800 for creating a performance model will be described.

Figure 19:
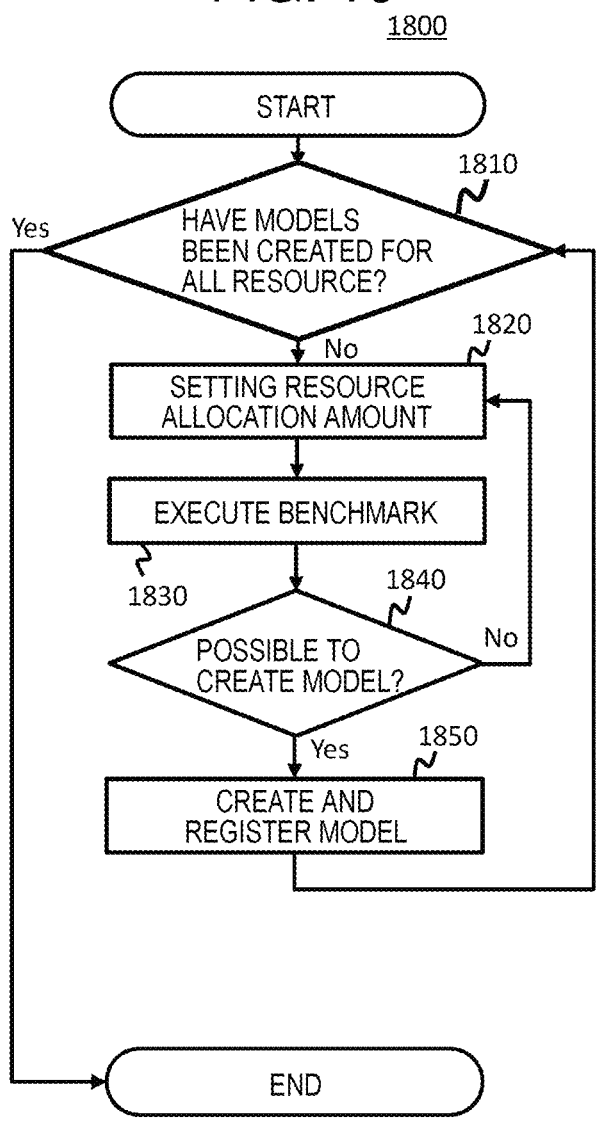
FIG. 19 is a flowchart of the performance model creation process according to the second embodiment.

FIG. 19 is a flowchart of the performance model creation process according to the second embodiment.

In the performance model creation process of the present embodiment, a performance model for each HW resource is created. Here, the HW resource is a CPU, a memory, a NIC band, an IO band of a disk device, or the like. According to the performance model creation process, a performance model indicating the relationship between the allocated amount of each HW resource and the performance of the app (strictly speaking, the program for the app) at the allocated amount is created for each HW resource.

First, the performance model creation program 1700 (strictly speaking, the CPU 1602 that executes the performance model creation program 1700) of the performance model creation node 1600 checks whether the performance models for all HW resources have been created (step 1810). As a result, when the performance models have been created for all the HW resources (step 1810: Yes), the performance model creation program 1700 ends the performance model creation process 1800.

On the other hand, when the performance models have not been created for all HW resources (step 1810: No), the performance model creation program. 1700 creates a performance model for the uncreated HW resources. Here, the HW resource to be a target is referred to as a target HW resource. When creating a performance model of the target HW resource, a performance model is created by setting the HW resource other than the target HW resource as an allocation amount that does not become a bottleneck in the performance of the target HW resource and gradually changing the HW resource allocation amount of the target HW resource.

First, the performance model creation program 1700 sets the HW resource amount to be allocated to the app (step 1820). The HW resource allocation amount in the app is set by linking with the resource allocation control program of each app execution node. Specifically, the performance model creation program 1700 transmits the HW resource allocation amount for the programs 1741, 1742, 1751, and 1752 of the app to the resource allocation control programs 1720 and 1730 of each of the app execution nodes 1620 and 1630. As a result, the resource allocation control programs 1720 and 1730 receive the HW resource allocation amount and allocate the HW resource of the received HW resource allocation amount to the program. Allocation of HW resources in the app execution node can be implemented by existing programs and software. For example, in the Linux operating system, a resource allocation function called Cgroups can be used. With Cgroups, a desired amount of HW resources can be allocated to a program running on the Linux operating system.

Next, the performance model creation program 1700 instructs the benchmark program 1710 of the benchmark execution node 1610 to execute the performance measurement for the target HW resource (step 1830). As a result, the benchmark program 1710 executes the performance measurement of the app (specifically, the program for the app) and transmits the result of the performance measurement to the performance model creation program 1700.

Next, the performance model creation program 1700 determines whether the performance model can be created, specifically, whether the performance measurement has been performed the number of times required to create the performance model (step 1840).

As a result, if the number of times required to create the performance model has not been completed (step 1840: No), the performance model creation program 1700 advance the process to step 1820 and repeats the change of the HW resource allocation amount and the execution of the performance measurement. The number of times the performance measurement is performed to create the performance model and the HW resource allocation amount to be changed for each performance measurement are predetermined.

On the other hand, if the number of measurements required to create the performance model has been performed (step 1840: Yes), the performance model creation program 1700 creates a performance model based on a plurality of measurement results, registers the created performance model in the performance model management table 1910 (see FIG. 21) (step 1850), and advances the process to step 1810.

Here, the creation of the performance model and the registration of the performance model will be described.

Figure 20:
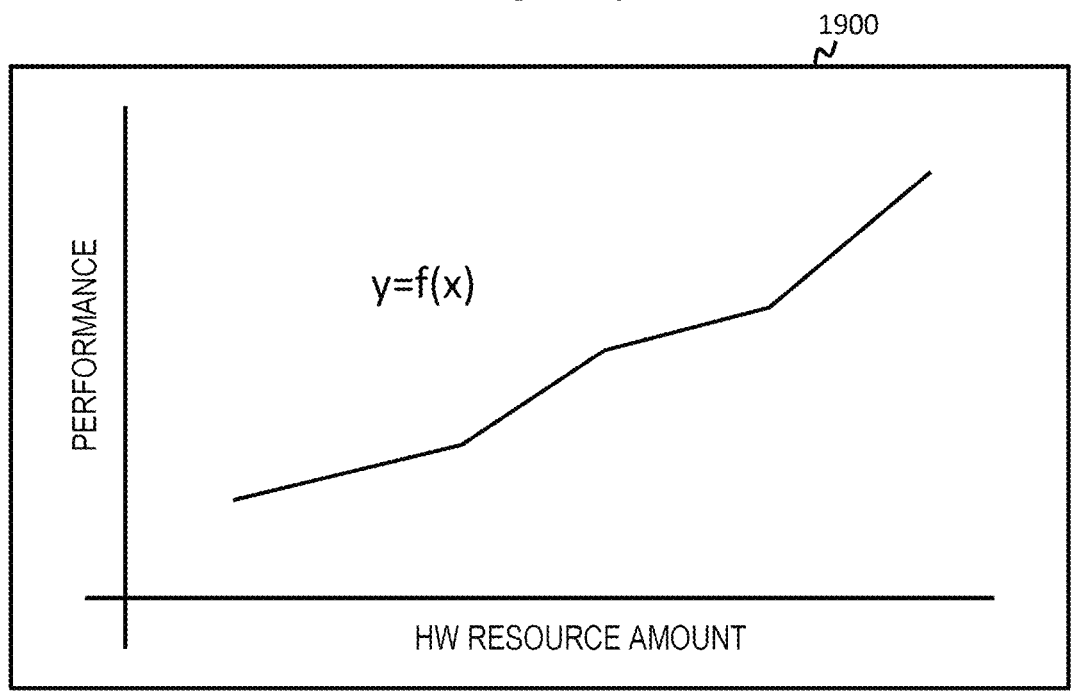
FIG. 20 is a diagram showing an outline of a performance model according to the second embodiment.

FIG. 20 is a diagram showing an outline of the performance model according to the second embodiment.

For the creation of the performance model, for example, as shown in FIG. 20, a graph 1900 of performance with respect to a change in the HW resource amount may be created and the formula of the approximate curve of the graph, $y=f(x)$, may be used as the performance model. Here, y indicates the performance of the application per node, and x indicates the HW resource amount per node. y can be calculated by dividing the result of the performance measurement from the benchmark program 1710 (the overall performance of the application) by the number of nodes of the application. In other words, multiplying y by the number of nodes of the application yields the performance of the entire application. The creation of graphs and the derivation of approximate curve formulas in the creation of performance models can be implemented by using existing spreadsheet software and programs.

Figure 21:
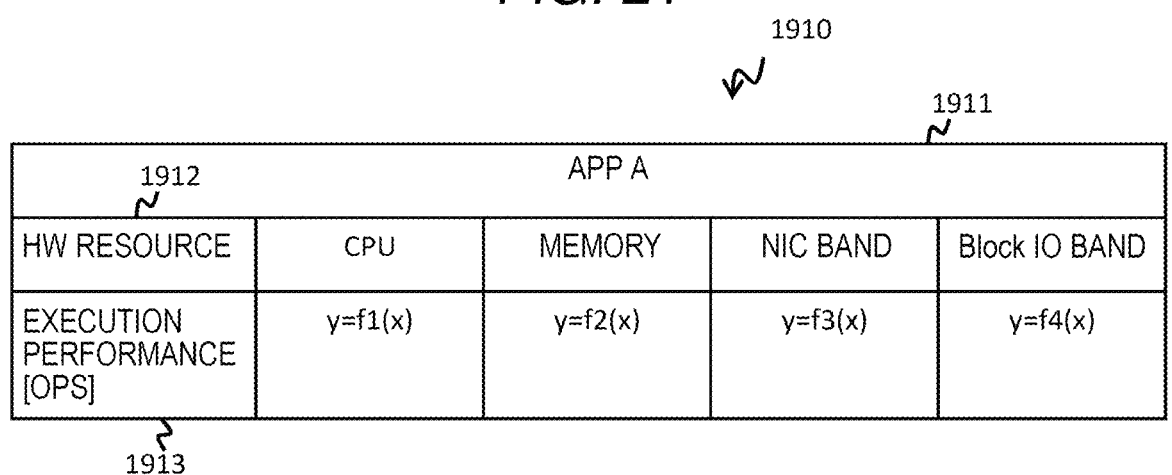
FIG. 21 is a configuration diagram of a performance model management table according to the second embodiment.

FIG. 21 is a configuration diagram of the performance model management table according to the second embodiment.

The performance model is registered, for example, in the performance model management table 1910. The row 1911 of the performance model management table 1910 stores information (application name) indicating an application corresponding to the performance model registered in the performance model management table 1910. The column 1912 stores the type of HW resource that corresponds to the performance model. The row 1913 stores a performance model for each HW resource for execution performance. In the cell of the row 1913, the performance model for the type of the HW resource is stored by the performance model creation program 1700.

In the present embodiment, the formula (performance model) created based on the performance measurement result is stored, but for example, a plurality of sets including the HW resource amount and the measured performance may be recorded.

Next, the resource allocation setting process will be described.

Figure 22:
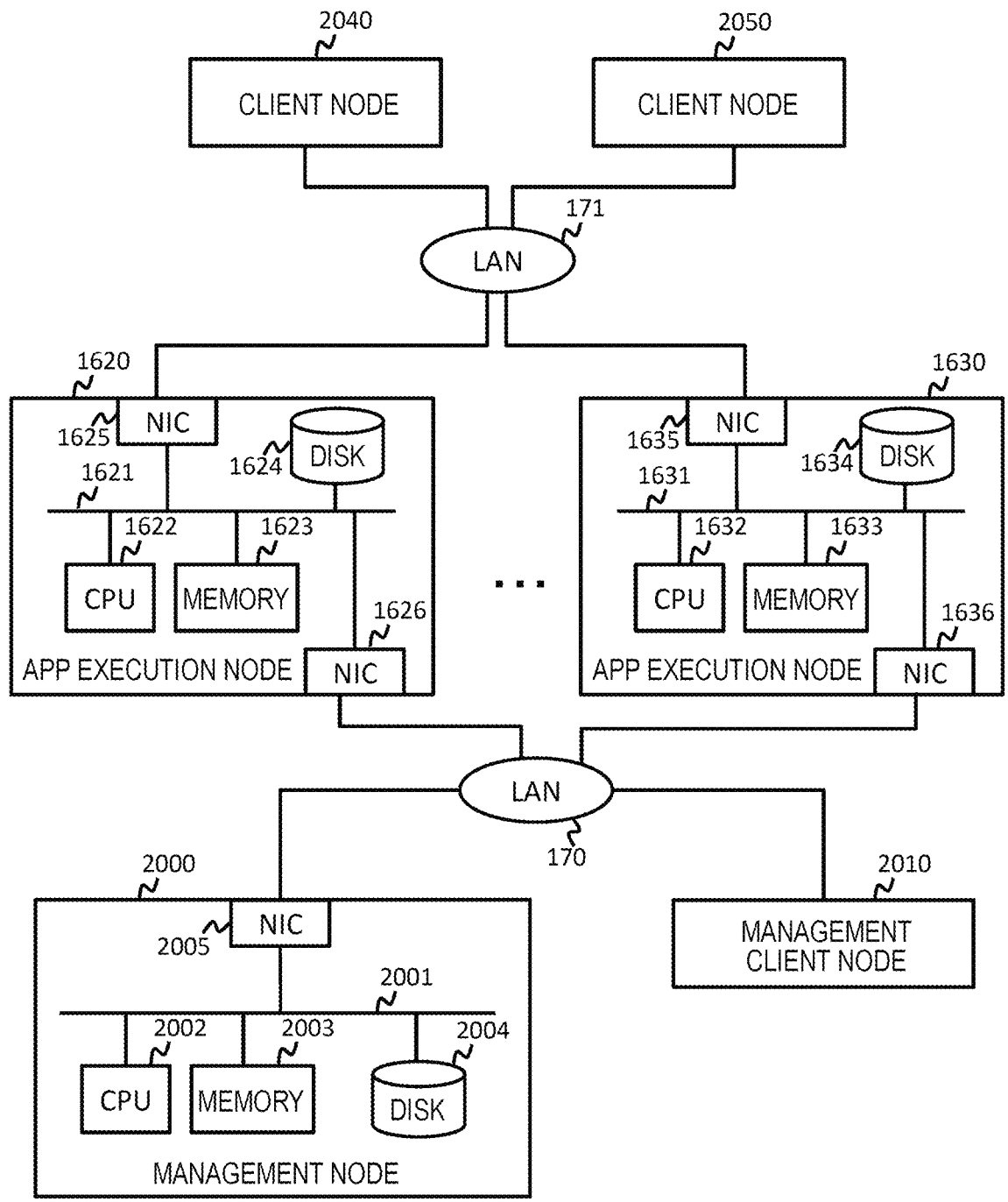
FIG. 22 is a hardware configuration diagram of components related to a resource allocation setting process according to the second embodiment.

FIG. 22 is a hardware configuration diagram of components related to the resource allocation setting process according to the second embodiment.

In the present embodiment, among the components of the computer system, the app execution nodes 1620 and 1630, the client nodes 2040 and 2050, the management node 2000, and the management client node 2010 are mainly involved in the resource allocation setting process.

The CPU 1622 of the app execution node 1620 transmits and receives data to and from other devices (the app execution node 1630, the client nodes 2040 and 2050, and the like) connected to the LAN 171 via the bus 1621 and the NIC 1625. The CPU 1622 of the app execution node 1620 transmits and receives data to and from another device (the management node 2000, or the like) connected to the LAN 170 via the bus 1621 and the NIC 1626.

The CPU 1632 of the app execution node 1630 transmits and receives data to and from other devices (the app execution node 1630, the client nodes 2040 and 2050, and the like) connected to the LAN 171 via the bus 1631 and the NIC 1635. The CPU 1632 of the app execution node 1630 transmits and receives data to and from another device (the management node 2000, or the like) connected to the LAN 170 via the bus 1631 and the NIC 1636.

The client nodes 2040 and 2050 execute IO for the app configured in the app execution nodes 1620 and 1630. Although not shown, each of the client nodes 2040 and 2050 includes a CPU, a memory, a NIC, and a disk device connected via a bus. The CPU calls the program stored in the disk device into the memory and executes the program. The client nodes 2040 and 2050 transmit and receive data to and from other devices (the app execution nodes 1620 and 1630, and the like) via the LAN 171.

Although not shown, the management client node 2010 includes a CPU, a memory, a NIC, and a disk device connected via a bus. The CPU calls the program stored in the disk device into the memory and executes the program. The management client node 2010 transmits and receives data to and from another device (the management server 2000, or the like) via the LAN 170.

The management node 2000 includes a CPU 2002 as an example of a processor, a memory 2003 as a main storage device, a disk device 2004 as a secondary storage device, and a NIC 2005. The CPU 2002, the memory 2003, the disk device 2004, and the NIC 2005 are connected via a bus 2001.

The CPU 2002 executes various processes by reading the program stored on the disk device 2004 into the memory 2003 and executing the program. The CPU 2002 transmits and receives data to and from other devices (the app execution nodes 1620 and 1630, the management client node 2010, and the like) connected to the LAN 170 via the bus 2001 and the NIC 2005.

Figure 23:
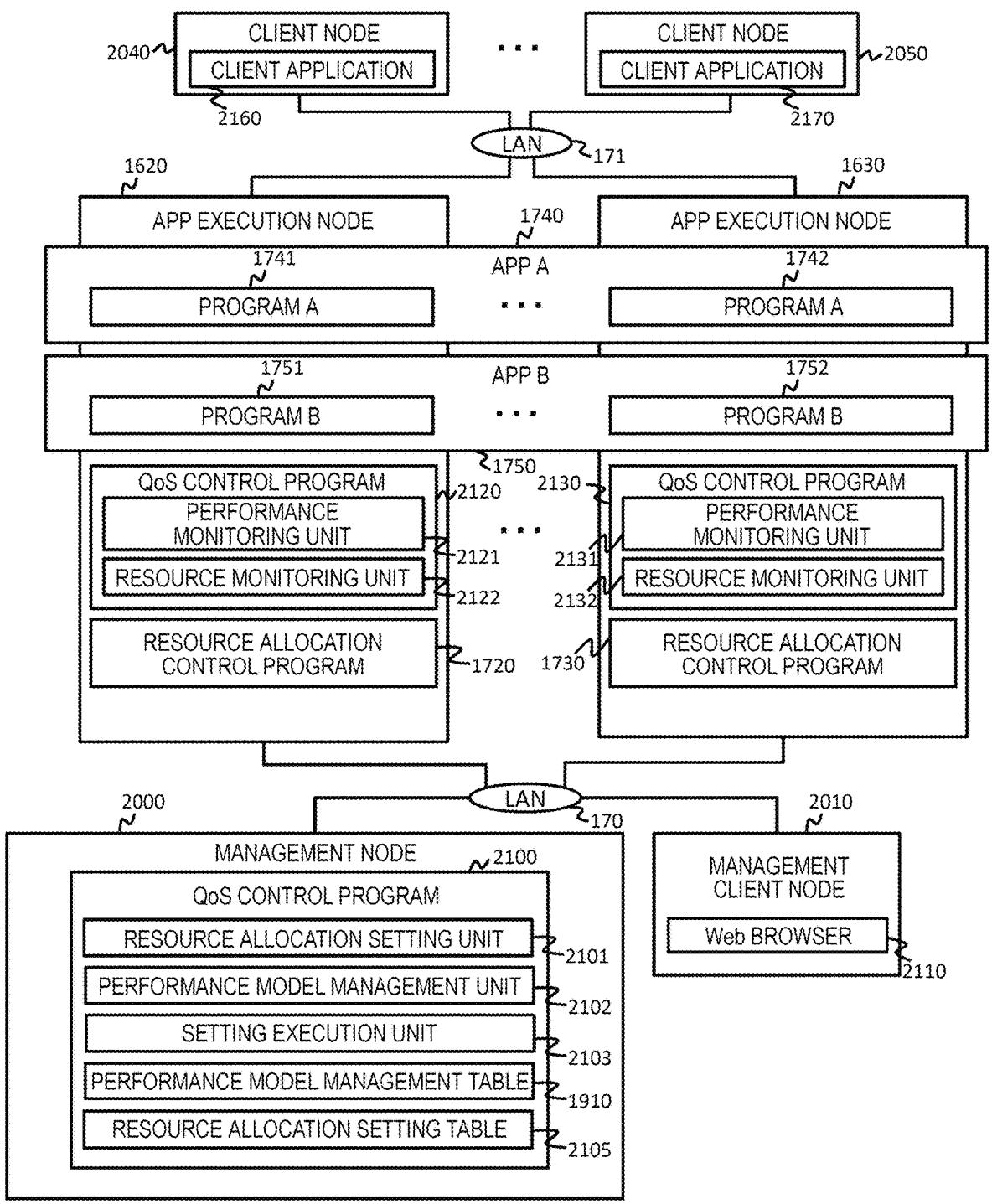
FIG. 23 is a logical configuration diagram of components related to the resource allocation setting process according to the second embodiment.

FIG. 23 is a logical configuration diagram of the components related to the resource allocation setting process according to the second embodiment. The same components as those shown in FIG. 18 are designated by the same reference numerals and the duplicate descriptions will be omitted.

The app execution node 1620 stores the program 1741 (program A), the program 1751 (program B), a QoS control program 2120, and the resource allocation control program 1720.

The app execution node 1630 stores the program 1742 (program A), the program 1752 (program B), a QoS control program 2130, and the resource allocation control program 1730.

The QoS control program 2120 of the app execution node 1620 includes a performance monitoring unit 2121 and a resource monitoring unit 2122, and when executed by the CPU 1622, monitors the performance and resource consumption of the programs 1741 and 1751.

The QoS control program 2130 of the app execution node 1630 includes a performance monitoring unit 2131 and a resource monitoring unit 2132, and when executed by the CPU 1632, monitors the performance and resource consumption of the programs 1742 and 1752.

The client node 2040 stores the client application 2160. The client application 2160 is executed by the client node 2040, thereby transmitting a processing request to the app configured by the app execution nodes 1620 and 1630.

The client node 2050 stores the client application 2170. The client application 2170 is executed by the client node 2050, thereby transmitting a processing request to the app configured by the app execution nodes 1620 and 1630.

The management client node 2010 stores a web browser 2110. The web browser 2110 is executed by the management client node 2010, thereby receiving the input of the target performance setting of the application from the administrator and transmitting the target setting to the management node 2000.

The management node 2000 stores the QoS control program 2100. The QoS control program 2100 includes a resource allocation setting unit 2101, a performance model management unit 2102, a setting execution unit 2103, a performance model management table 1910, and a source allocation setting table 2105. Although omitted in the drawing, the QoS control program 2100 includes performance model management tables 1910 as much as the number of applications executed by the app execution node.

The resource allocation setting unit 2101 is executed by the CPU 2002 of the management node 2000, and thus, receives the target performance of the application input via the web browser 2110, updates the resource allocation setting table 2105 based on the received target performance and the contents of the performance model management table 1910, and transmits the set value of the resource allocation amount to the app execution nodes 1620 and 1630.

The performance model management unit 2102 is executed by the CPU 2002, thereby receiving the monitoring results of the performance and resource consumption of the programs 1741, 1742, 1751, and 1752 from the QoS control programs 2120 and 2130 executed by the app execution nodes 1620 and 1630, and modifying the performance model based on the monitoring results. The performance model management unit 2102 updates the resource allocation setting table 2105 based on the modified performance model and transmits the set value of the resource allocation amount to the app execution nodes 1620 and 1630.

Next, the resource allocation setting process 2200 for setting the allocation of HW resources to the application will be described.

Figure 24:
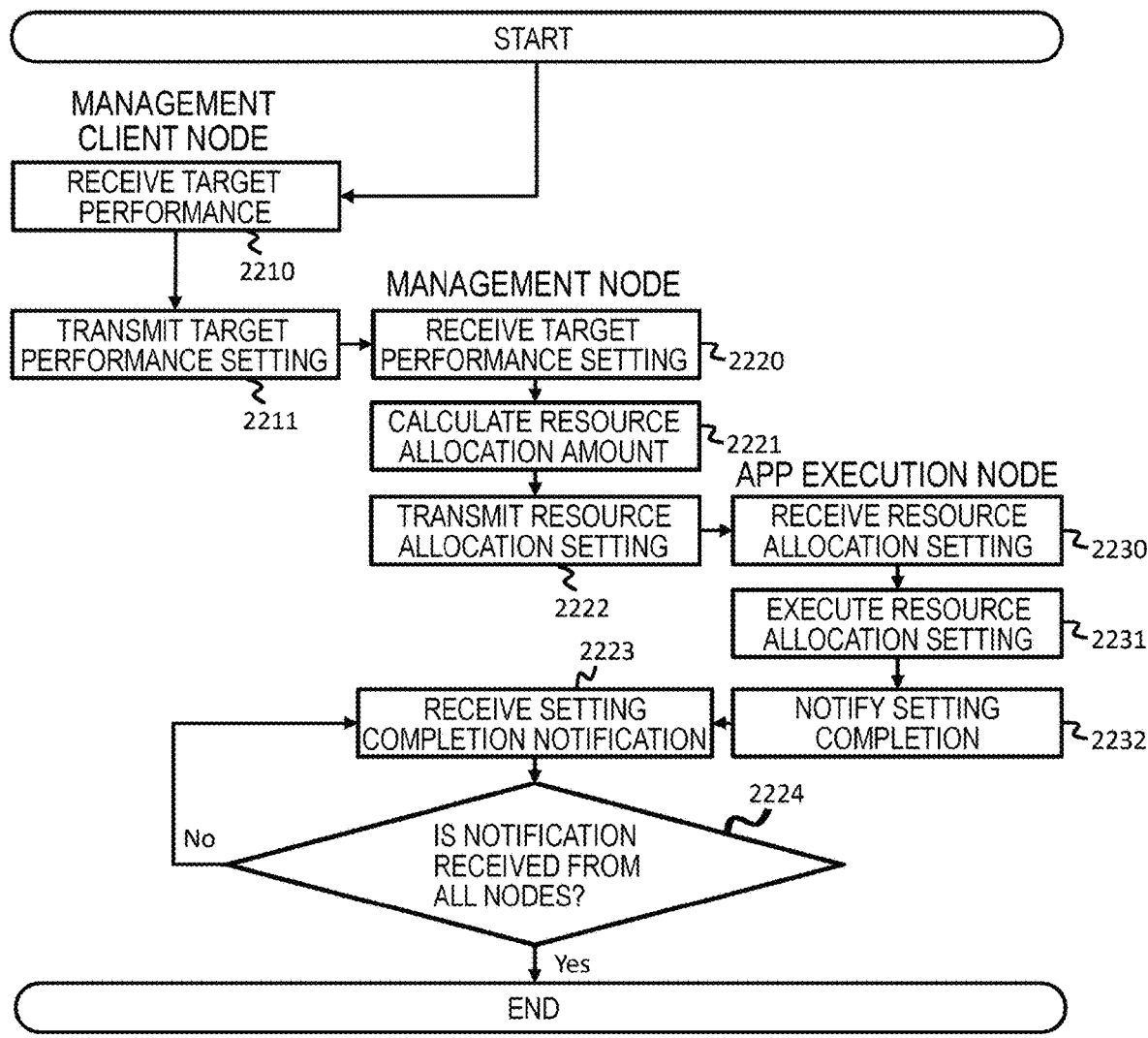
FIG. 24 is a flowchart of the resource allocation setting process according to the second embodiment.

FIG. 24 is a flowchart of the resource allocation setting process according to the second embodiment.

The web browser 2110 of the management client node 2010 displays a GUI screen 2300 inputting for target performance (see FIG. 25) and receives the target performance of each application from the application administrator (step 2210).

Here, the GUI screen 2300 for inputting target performance will be described.

Figure 25:
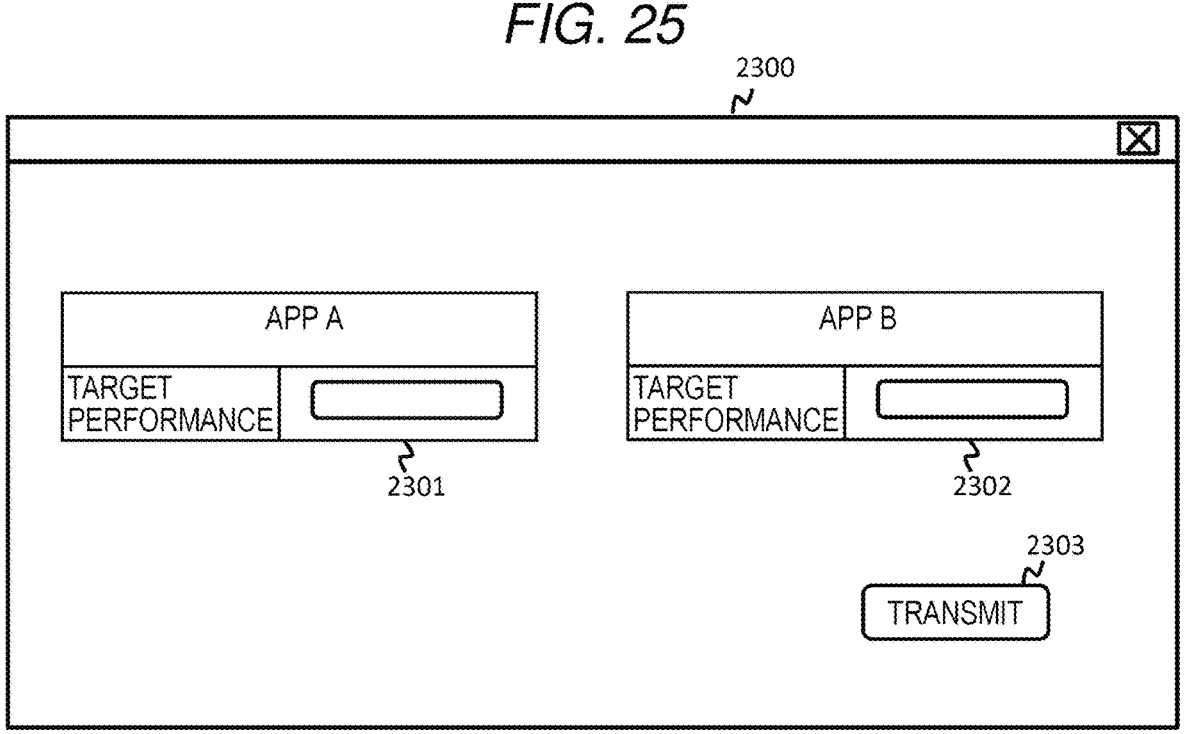
FIG. 25 is a diagram showing a GUI screen for inputting target performance according to the second embodiment.

FIG. 25 is a diagram showing a GUI screen for inputting target performance according to the second embodiment.

The GUI screen 2300 for inputting the target performance includes an input field (input fields 2301 and 2302) for the target performance for each application and a transmit button 2303. The GUI screen 2300 for inputting target performance shown in FIG. 25 shows an input field when there are two applications, app A and app B, but the input field is prepared as many as the number of applications configured on the app execution node. The input fields 2301 and 2302 are input fields for inputting the target performance for the application. The administrator may enter the target performance for each application in the input field. The transmit button 2303 is a button that receives an instruction to transmit the target performance setting input in the input fields 2301 and 2302 to the app execution node. When the transmit button 2303 is pressed, the management client node 2010 transmits the target performance setting input in the input fields 2301 and 2302 to the management node 2000.

Next, the resource allocation setting unit 2101 of the management node 2000 receives the transmitted target performance setting (step 2220). The resource allocation setting unit 2101 registers the received target performance in the resource allocation setting table 2105 (see FIG. 26).

Figure 26:
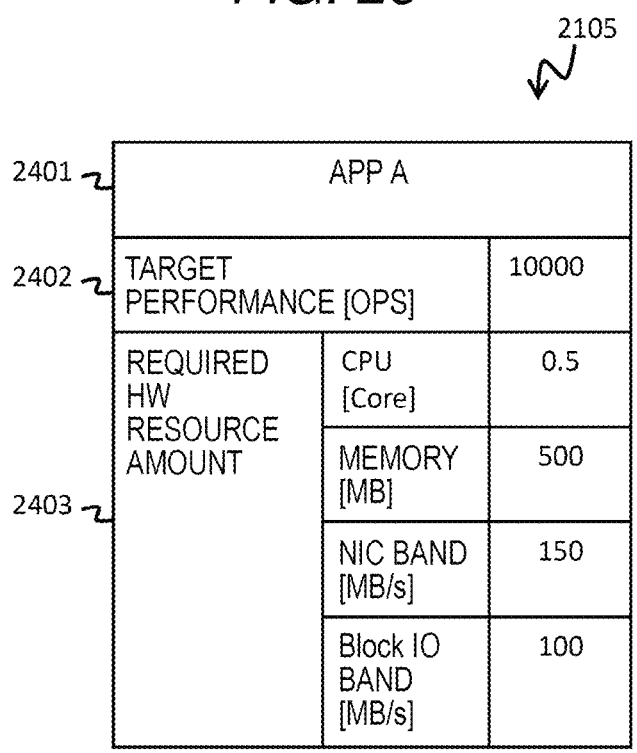
FIG. 26 is a configuration diagram of a resource allocation setting table according to the second embodiment.

FIG. 26 is a configuration diagram of the resource allocation setting table according to the second embodiment.

The resource allocation setting table 2105 is provided for each application configured in the app execution node and manages the relationship between the target performance of the application and the required amount of HW resources. The row 2401 of the resource allocation setting table 2105 stores information (application name) indicating an application corresponding to the resource allocation setting table 2105. The row 2402 stores the target performance of the application. The row 2403 stores the resource amount for each HW resource required for the target performance.

Referring back to the description of FIG. 24, next, the resource allocation setting unit 2101 refers to the performance model management table 1910 and calculates the HW resource amount (resource allocation amount) actually allocated to the application. Here, the calculated HW resource amount is the HW resource amount allocated to the application program in each app execution node.

First, the resource allocation setting unit 2101 calculates the HW resource amount required to achieve this target performance from the performance model (formula) recorded in the performance model management table 1910 and the target performance of the application, and registers the calculated HW resource amount as the resource allocation amount in the row 2403 of the resource allocation setting table 2105 (step 2221). Specifically, the resource allocation setting unit 2101 divides the target performance of the application by the number of app execution nodes constituting the application and substitutes y of the performance model formula (y=f (x)) with the result to calculate the required HW resource amount x. If a plurality of sets including the HW resource amount and the measured performance are recorded instead of the performance model, the HW resource amount required for the target performance can be calculated based on the plurality of sets.

Next, the resource allocation setting unit 2101 transmits the contents of the column 2403 of the resource allocation setting table 2105, that is, the resource allocation amount for each HW resource to the resource allocation control programs 1720 and 1730 of each of the app execution nodes 1620 and 1630 (step 2222).

The resource allocation control programs 1720 and 1730 of the app execution nodes 1620 and 1630 receive the contents of the row 2403 of the resource allocation setting table 2105 (step 2230), and sets to allocate HW resources to the application program based on the resource allocation amount for each HW resource which is the contents of the row 2403 (step 2231).

When the allocation setting is completed, the resource allocation control programs 1720 and 1730 transmits a notification (setting completion notification) indicating that the setting has been completed to the resource allocation setting unit 2101 of the management node 2000 (step 2232).

The resource allocation setting unit 2101 of the management node 2000 receives the setting completion notification (step 2223) and checks whether the setting completion notification has been received from all the app execution nodes that have transmitted the resource allocation amount for each HW resource (step 2224). If the setting completion notification has not been received from all the app execution nodes (step 2224: No), the resource allocation setting unit 2101 advances the process to step 2223, whereas if the setting completion notification has been received from all the app execution nodes (step 2224: Yes), the resource allocation setting unit 2101 ends the resource allocation setting process 2200.

Next, the performance model modification and setting update process 2500 that modifies the performance model and sets again the resource allocation based on the modified performance model will be described.

Figure 27:
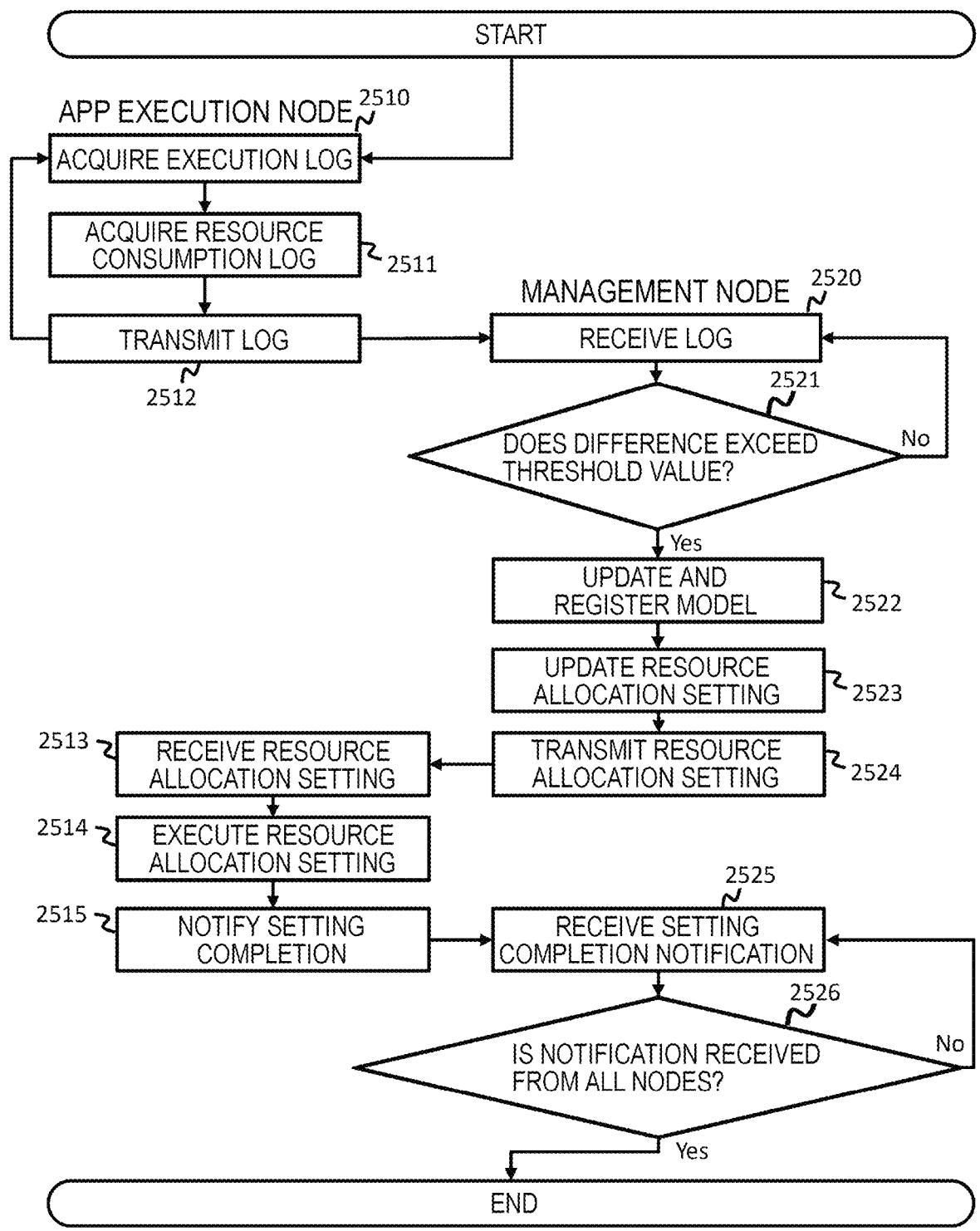
FIG. 27 is a flowchart of a performance model modification and setting update process according to the second embodiment.

FIG. 27 is a flowchart of the performance model modification and setting update process according to the second embodiment.

The performance model modification and setting update process is executed periodically, for example. First, the performance monitoring units 2121 and 2131 of the QoS control programs 2120 and 2130 of the app execution nodes 1620 and 1630 acquire the execution log of the program of each application (step 2510). Here, in the execution log, the contents of the operation executed by the programs 1741, 1742, 1751, and 1752, the timing at which the operation is executed, the processing time, and the like are recorded. Next, the resource monitoring units 2122 and 2132 acquire a log (resource consumption log) of the HW resource amount consumed by the programs 1741, 1742, 1751, and 1752 of each application (step 2511). The resource consumption log can be acquired by using the function of the operating system (OS) or the like.

Next, the QoS control programs 2120 and 2130 transmit the acquired execution log and resource consumption log to the performance model management unit 2102 of the management node 2000 (step 2512).

The performance model management unit 2102 of the management node 2000 receives the execution log and the resource consumption log transmitted from the app execution nodes 1620 and 1630 (step 2520).

Next, the performance model management unit 2102 acquires the actual performance of the application from the execution log, compares the actual performance with the performance estimated by the performance model (estimated performance), and determines whether the difference between the actual performance and the estimated performance exceeds a predetermined threshold value set in advance (step 2521). As a result, if the difference between the actual performance and the estimated performance does not exceed a predetermined threshold value (step 2521: No), the performance model management unit 2102 advances the process to step 2520. On the other hand, if the difference between the actual performance and the estimated performance exceeds the predetermined threshold value (step 2521: Yes), the performance model management unit 2102 performs a process of modifying the performance model and updates the performance model of the performance model management table 1910 to the modified performance model (step 2522). The process of modifying the performance model can be implemented by the same process as the performance model creation process 1800 based on the acquired resource consumption log and the performance value acquired from the execution log.

Next, the performance model management unit 2102 performs a process of calculating a new resource allocation amount based on the updated performance model of the performance model management table 1910 and updates the resource allocation setting table 2105 (step 2523). The process of calculating the new resource allocation amount can be implemented by the same process as the resource allocation setting process 2200.

Next, the performance model management unit 2102 transmits the contents of the row 2403 of the resource allocation setting table 2105, that is, the resource allocation amount for each HW resource to the resource allocation control programs 1720 and 1730 of the app execution nodes 1620 and 1630 (step 2524).

The resource allocation control programs 1720 and 1730 of the app execution nodes 1620 and 1630 receive the contents of the row 2403 of the resource allocation setting table 2105 (step 2513), and sets to allocate HW resources to the application program based on the resource allocation amount for each HW resource of the row 2403 (step 2514).

When the allocation setting is completed, the resource allocation control programs 1720 and 1730 transmits a notification (setting completion notification) indicating that the setting has been completed to the performance model management unit 2102 of the management node 2000 (step 2515).

The performance model management unit 2102 of the management node 2000 receives the setting completion notification (step 2525) and checks whether the setting completion notification has been received from all the app execution nodes that have transmitted the resource allocation amount for each HW resource (step 2526). If the setting completion notification has not been received from all the app execution nodes (step 2526: No), the performance model management unit 2102 advances the process to step 2525, whereas the setting completion notification has been received from all the app execution nodes (step 2526: Yes), the performance model management unit 2102 ends the performance model modification and setting update process 2500.

According to the performance model modification and setting update process 2500, it is possible to update to an appropriate performance model according to the actual situation of the processing of each of the app execution nodes 1620 and 1630 and it is possible to appropriately allocate HW resources according to the actual situation.

The present invention is not limited to the above-described embodiments and can be appropriately modified and implemented without departing from the spirit of the present invention.

For example, in the above embodiment, a mathematical formula is used as a performance model, but the present invention is not limited thereto. For example, an inference model that outputs a required HW resource amount by inputting performance learned by machine learning may be used.

In the above embodiment, a part or all of the processing performed by the CPU may be performed by the hardware circuit. The program in the above embodiment may be installed from the program source. The program source may be a program distribution server or recording media (for example, portable non-volatile recording media).

What is claimed is:

1. A resource allocation control device that controls the amount of hardware resources of a predetermined node to be allocated to software executed on the node, the device comprising:
a storage unit that stores a plurality of performance resource amount information respectively indicating, for each operation of a plurality of different operations of the software, a correspondence relationship between the amount of hardware resources for each of a plurality of types of hardware resources to be allocated for each operation and the performance of each operation upon an implementation of the hardware of the resource amount to be allocated; and
a processor connected to the storage unit,
wherein the processor is configured to:
receive a target performance of each operation of the software,
individually calculate, for each type of hardware resource, the amount of hardware resources required to implement the target performance of each of the different operations based on the respective plurality of performance resource amount information,
determine, for each type of hardware resource to be used for the plurality of operations of the software, a resource amount to be allocated for all the operations based on a greatest resource amount among the calculated amount of hardware resources required to implement the target performance of each operation, and
set the allocation of the determined resource amount to the software.

2. The resource allocation control device according to claim 1, wherein
the processor is configured to:
change the resource amount of the hardware to be allocated to the software to a plurality of resource amounts to acquire the performance implemented when each of the plurality of resource amounts is allocated,
create the performance resource amount information based on the allocated hardware resource amount and the implemented performance, and
store the created performance resource amount information in the storage unit.

3. The resource allocation control device according to claim 1, wherein
the processor is configured to:
acquire the performance in the execution of the software to which the hardware of the resource amount determined from the node is assigned,
update the performance resource amount information based on the acquired performance,
determine the hardware resource amount required to achieve the target performance based on the updated performance resource amount information, and
set the allocation of the determined resource amount to the software.

4. The resource allocation control device according to claim 1, wherein
the software is software that is executed on each of a plurality of nodes and constitutes a distributed data store that distributes and manages data on the plurality of nodes.

5. The resource allocation control device according to claim 4, wherein
the operations of the software include input/output (I/O) operations.

6. A computer system comprising:
one or more execution nodes that execute software; and
a resource allocation control device that controls the hardware resource amount of the execution node assigned to the software,
wherein the resource allocation control device comprises:
a storage unit that stores a plurality of performance resource amount information respectively indicating, for each operation of a plurality of different operations of the software, a correspondence relationship between the amount of hardware resources for each of a plurality of types of hardware resources to be allocated for each operation and the performance of each operation upon an implementation of the hardware of the resource amount to be allocated; and
a processor connected to the storage unit,
wherein the processor is configured to:
receive a target performance of each operation of the software,
individually calculate, for each type of hardware resource, the amount of hardware resources required to achieve the target performance of each of the different operations based on the respective plurality of performance resource amount information,
determine, for each type of hardware resource to be used for the plurality of operations of the software, a resource amount to be allocated for all the operations based on a greatest resource amount among the calculated amount of hardware resources required to implement the target performance of each operation, and
set the allocation of the determined resource amount to the software.

7. The computer system according to claim 6, further comprising:
a creation node that creates the performance resource amount information, wherein
the creation node is configured to:
change the resource amount of the hardware to be allocated to the software to a plurality of resource amounts to acquire the performance implemented when each of the plurality of resource amounts is allocated,
create the performance resource amount information based on the allocated hardware resource amount and the acquired performance, and
transmit the created performance resource amount information to the resource allocation control device.

8. A resource allocation control method by a resource allocation control device that controls the amount of hardware resources of a predetermined node to be allocated to software executed on the node, the method comprising:
storing a plurality of performance resource amount information respectively indicating, for each operation of a plurality of different operations of the software, a correspondence relationship between the amount of hardware resources for each of a plurality of types of hardware resources to be allocated for each operation and the performance of each operation upon an implementation of the hardware of the resource amount to be allocated, in a storage unit;
receiving a target performance of each operation of the software;

individually calculating, for reach type of hardware resource, the amount of hardware resources required to achieve the target performance of each of the different operations based on the respective plurality of performance resource amount information;
determining, for each type of hardware resource to be used for the plurality of operations of the software, a resource amount to be allocated for all the operations based on a greatest resource amount among the calculated amount of hardware resources required to implement the target performance of each operation; and
setting the allocation of the determined resource amount to the software.

* * * * *